US012595397B2

(12) United States Patent
Zheng et al.

(10) Patent No.: US 12,595,397 B2
(45) Date of Patent: Apr. 7, 2026

(54) SURFACE-MODIFIED SILICONE ROOFING MATERIALS AND RELATED SYSTEMS AND RELATED METHODS

(71) Applicant: BMIC LLC, Dallas, TX (US)

(72) Inventors: Yan Zheng, Parisippany, NJ (US); Jon Henson, Parisippany, NJ (US); Steven Heinje, Parisippany, NJ (US); Andrew Andrade, Hackensack, NJ (US); Adem Chich, Kearny, NJ (US); Joshua Tingley, Morris Plains, NJ (US); Michael Dougherty, Mount Arlington, NJ (US); Daniel Pena, Parisippany, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/821,189

(22) Filed: Aug. 30, 2024

(65) Prior Publication Data

US 2025/0075106 A1     Mar. 6, 2025

Related U.S. Application Data

(60) Provisional application No. 63/580,109, filed on Sep. 1, 2023.

(51) Int. Cl.
*C09J 7/29*          (2018.01)
*C09J 5/00*          (2006.01)
(Continued)

(52) U.S. Cl.
CPC . *C09J 7/29* (2018.01); *C09J 5/00* (2013.01); *E04D 5/12* (2013.01); *E04D 5/148* (2013.01);
(Continued)

(58) Field of Classification Search
CPC .... E04D 5/12; E04D 5/00; E04D 5/02; E04D 5/06; E04D 5/10
See application file for complete search history.

(56) References Cited

U.S. PATENT DOCUMENTS

| | | | |
|---|---|---|---|
| 4,668,315 | A | 5/1987 | Brady et al. |
| 5,369,012 | A | 11/1994 | Koontz et al. |

(Continued)

FOREIGN PATENT DOCUMENTS

| | | |
|---|---|---|
| CN | 111868945 A | 10/2020 |
| JP | 2012219195 A | 11/2012 |

(Continued)

*Primary Examiner* — Zachary M Davis
(74) *Attorney, Agent, or Firm* — GREENBERG TRAURIG, LLP

(57)          ABSTRACT

Silicone roofing materials are provided. A roofing material comprises at least one of a plurality of particles, a silicone coating, a substrate, an adhesive layer, a release liner, or any combination thereof. The substrate is located between the silicone coating and the adhesive layer. The adhesive layer is located between the substrate and the release liner. The release liner covers at least a portion of the adhesive layer. The plurality of particles covers at least a portion of a surface of the silicone coating. Each of the plurality of particles has a surface. When the roofing material is installed on a roofing substrate, at least a portion of the surface of the plurality of particles is exposed to an environment. Related systems and related methods are also provided.

18 Claims, 5 Drawing Sheets

(51) Int. Cl.
    *E04D 5/12*          (2006.01)
    *E04D 5/14*          (2006.01)

(52) U.S. Cl.
    CPC ...... *C09J 2203/346* (2020.08); *C09J 2301/16*
                 (2020.08); *C09J 2301/41* (2020.08)

(56)               References Cited

U.S. PATENT DOCUMENTS

| | | | |
|---|---|---|---|
| 5,620,773 | A | 4/1997 | Nash |
| 7,214,288 | B2 | 5/2007 | Mng et al. |
| 7,695,967 | B1 | 4/2010 | Russell et al. |
| 9,834,935 | B2 | 12/2017 | Loftus et al. |
| 2013/0065020 | A1* | 3/2013 | Loftus ...................... E04D 5/12 |
| | | | 428/143 |
| 2013/0168616 | A1* | 7/2013 | Shiao ..................... C09C 3/063 |
| | | | 427/213 |
| 2017/0002159 | A1 | 1/2017 | Ahn et al. |
| 2019/0270272 | A1 | 9/2019 | Grube et al. |
| 2020/0011060 | A1 | 1/2020 | Haynes et al. |
| 2020/0354282 | A1 | 11/2020 | Schweiger et al. |
| 2022/0389716 | A1 | 12/2022 | Vega-Gutierrez et al. |

FOREIGN PATENT DOCUMENTS

| | | | |
|---|---|---|---|
| JP | 2017508852 | A | 3/2017 |
| WO | 2011102973 | A1 | 8/2011 |

* cited by examiner

102

400

| OBTAINING A ROLL OF A ROOFING MEMBRANE | 402 |

| UNROLLING THE ROLL OF THE ROOFING MEMBRANE | 404 |

| REMOVING A RELEASE LINER FROM THE ROOFING MEMBRANE | 406 |

| CONTACTING THE ROOFING MEMBRANE TO A ROOFING SUBSTRATE | 408 |

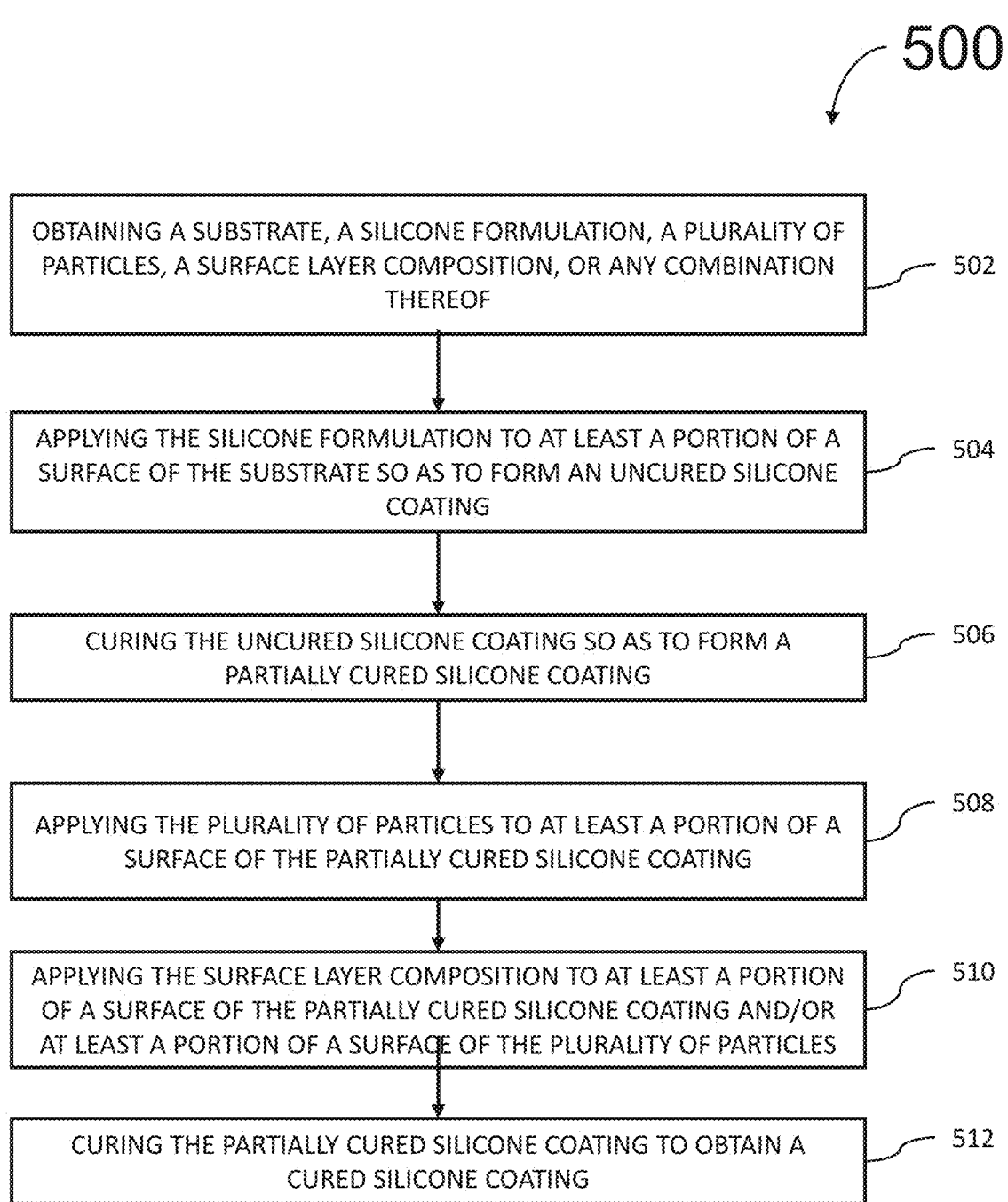

500

OBTAINING A SUBSTRATE, A SILICONE FORMULATION, A PLURALITY OF PARTICLES, A SURFACE LAYER COMPOSITION, OR ANY COMBINATION THEREOF — 502

APPLYING THE SILICONE FORMULATION TO AT LEAST A PORTION OF A SURFACE OF THE SUBSTRATE SO AS TO FORM AN UNCURED SILICONE COATING — 504

CURING THE UNCURED SILICONE COATING SO AS TO FORM A PARTIALLY CURED SILICONE COATING — 506

APPLYING THE PLURALITY OF PARTICLES TO AT LEAST A PORTION OF A SURFACE OF THE PARTIALLY CURED SILICONE COATING — 508

APPLYING THE SURFACE LAYER COMPOSITION TO AT LEAST A PORTION OF A SURFACE OF THE PARTIALLY CURED SILICONE COATING AND/OR AT LEAST A PORTION OF A SURFACE OF THE PLURALITY OF PARTICLES — 510

CURING THE PARTIALLY CURED SILICONE COATING TO OBTAIN A CURED SILICONE COATING — 512

SURFACE-MODIFIED SILICONE ROOFING MATERIALS AND RELATED SYSTEMS AND RELATED METHODS

CROSS-REFERENCE TO RELATED APPLICATIONS

The present application claims priority to and benefit of U.S. Provisional Patent Application No. 63/580,109, filed Sep. 1, 2023 and entitled "SILICONE ROOFING MEMBRANES, RELATED SYSTEMS, AND RELATED METHODS," the entirety of which is herein incorporated by reference.

FIELD

This disclosure generally relates to surface-modified silicone roofing materials and related systems and related methods.

BACKGROUND

During manufacturing, roofing membranes are formed with various defects. These defects frequently result in the roofing membranes being discarded as waste.

SUMMARY

Some embodiments relate to a roll. In some embodiments, the roll comprises a roofing membrane. In some embodiments, the roofing membrane has a first surface and a second surface opposite the first surface. In some embodiments, at least a portion of the second surface of the roofing membrane contacts at least a portion of the first surface of the roofing membrane. In some embodiments, at least a portion of the second surface of the roofing membrane is an outer surface of the roll. In some embodiments, the roofing membrane comprises a plurality of particles. In some embodiments, the roofing membrane comprises a silicone coating. In some embodiments, the roofing membrane comprises a substrate. In some embodiments, the roofing membrane comprises an adhesive layer. In some embodiments, the roofing membrane comprises a release liner. In some embodiments, the substrate is located between the silicone coating and the adhesive layer. In some embodiments, the adhesive layer is located between the substrate and the release liner. In some embodiments, the release liner covers at least a portion of the adhesive layer. In some embodiments, the plurality of particles covers at least a portion of a surface of the silicone coating. In some embodiments, each of the plurality of particles has a surface. In some embodiments, when the roofing membrane is installed on a roofing substrate, at least a portion of the surface of the plurality of particles is exposed to an environment. In some embodiments, the first surface of the roofing membrane is the surface of the silicone coating. In some embodiments, the second surface of the roofing membrane is a surface of the release liner.

In some embodiments, when the roofing membrane is installed on a roofing substrate, at least a portion of the surface of the silicone coating is exposed to the environment.

In some embodiments, when the roofing membrane is installed on a roofing substrate, 1% to 99% of the surface of the plurality of particles is exposed to the environment. In some embodiments, when the roofing membrane is installed on a roofing substrate, 1% to 99% of the surface of the silicone coating is exposed to the environment.

In some embodiments, the plurality of particles directly contacts the surface of the silicone coating.

In some embodiments, the plurality of particles is embedded in the surface of the silicone coating.

In some embodiments, the plurality of particles covers 50% to 99% of the surface of the silicone coating.

In some embodiments, the plurality of particles comprises at least one of a sand, a polymer fiber, a glass fiber, a glass bead, a recycled granule, a polymeric granule, a mineral granule, a water-soluble granule, a polymeric powder, or any combination thereof.

In some embodiments, the substrate comprises at least one of a mesh, a fabric, a scrim, a woven, a non-woven, or any combination thereof.

In some embodiments, the silicone coating comprises at least one of a polysiloxane, a silyl-terminated polymer, or any combination thereof.

Some embodiments relate to a roofing system. In some embodiments, the roofing system comprises a roofing substrate. In some embodiments, the roofing system comprises a roofing membrane. In some embodiments, the roofing membrane is located on the roofing substrate. In some embodiments, the roofing membrane comprises a plurality of particles. In some embodiments, the roofing membrane comprises a silicone coating. In some embodiments, the roofing membrane comprises a substrate. In some embodiments, the roofing membrane comprises an adhesive layer. In some embodiments, the substrate is located between the silicone coating and the adhesive layer. In some embodiments, the adhesive layer is located between the substrate and the roofing substrate. In some embodiments, the adhesive layer adheres the roofing membrane to the roofing substrate. In some embodiments, the plurality of particles covers at least a portion of a surface of the silicone coating. In some embodiments, each of the plurality of particles has a surface. In some embodiments, at least a portion of the surface of the plurality of particles is exposed to an environment.

In some embodiments, at least a portion of the surface of the silicone coating is exposed to the environment.

In some embodiments, the plurality of particles directly contacts the surface of the silicone coating. In some embodiments, the plurality of particles is embedded in the surface of the silicone coating.

In some embodiments, the plurality of particles comprises at least one of a sand, a polymer fiber, a glass fiber, a glass bead, a recycled granule, a polymeric granule, a mineral granule, a water-soluble granule, a polymeric powder, or any combination thereof.

In some embodiments, the substrate comprises at least one of a mesh, a fabric, a scrim, a woven, a non-woven, or any combination thereof.

In some embodiments, the silicone coating comprises at least one of a polysiloxane, a silyl-terminated polymer, or any combination thereof.

Some embodiments relate to a method of installation. In some embodiments, the method of installation comprises obtaining a roll of a roofing membrane. In some embodiments, the roofing membrane has a first surface and a second surface opposite the first surface. In some embodiments, at least a portion of the second surface of the roofing membrane contacts at least a portion of the first surface of the roofing membrane. In some embodiments, at least a portion of the second surface of the roofing membrane is an outer surface of the roll. In some embodiments, the roofing membrane comprises a plurality of particles. In some embodiments, the roofing membrane comprises a silicone coating. In some embodiments, the roofing membrane comprises a substrate. In some embodiments, the roofing membrane comprises an adhesive layer. In some embodiments, the roofing membrane comprises a release liner. In some embodiments, the substrate is located between the silicone coating and the adhesive layer. In some embodiments, the adhesive layer is located between the substrate and the release liner. In some embodiments, the release liner covers at least a portion of the adhesive layer. In some embodiments, the plurality of particles covers at least a portion of a surface of the silicone coating. In some embodiments, each of the plurality of particles has a surface. In some embodiments, the first surface of the roofing membrane is the surface of the silicone coating. In some embodiments, the second surface of the roofing membrane is a surface of the release liner. In some embodiments, the method of installation comprises unrolling the roll of the roofing membrane. In some embodiments, the method of installation comprises removing the release liner from the roofing membrane so as to expose the adhesive layer. In some embodiments, the method of installation comprises contacting the adhesive layer of the roofing membrane to a roofing substrate so as to adhere the roofing membrane to the roofing substrate. In some embodiments, at least a portion of the surface of the plurality of particles is exposed to an environment.

In some embodiments, at least a portion of the surface of the silicone coating is exposed to the environment.

In some embodiments, the plurality of particles is embedded in the surface of the silicone coating.

In some embodiments, the plurality of particles comprises at least one of a sand, a polymer fiber, a glass fiber, a glass bead, a recycled granule, a polymeric granule, a mineral granule, a water-soluble granule, a polymeric powder, or any combination thereof.

BRIEF DESCRIPTION OF THE DRAWINGS

Reference is made to the drawings that form a part of this disclosure, and which illustrate embodiments in which the materials and methods described herein can be practiced.

FIG. 5 is a flowchart of a method of manufacturing a roofing membrane, according to some embodiments.

DETAILED DESCRIPTION

Figure 1:
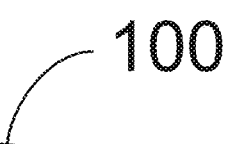
FIG. 1 is a schematic diagram of a cross-section of a roofing membrane, according to some embodiments.
Figure 1:
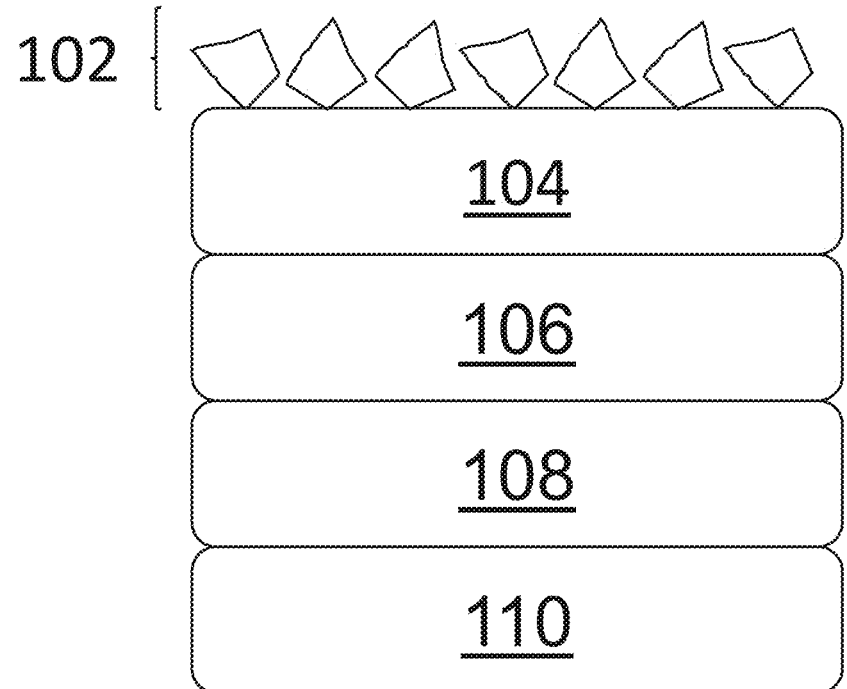

Some embodiments relate to surface-modified silicone roofing materials and related systems, related methods, and related coatings.

As used herein, the term "roofing material" refers to at least one of a roofing membrane, a roofing shingle, a roofing substrate, a roofing accessory, or any combination thereof. For example, in some embodiments, the roofing material comprises a roofing membrane. In some embodiments, the roofing material comprises a roofing shingle. In some embodiments, the roofing material comprises a roofing substrate. In some embodiments, the roofing material comprises a roofing accessory.

Some embodiments relate to a surface-modified silicone roofing membrane. For example, in some embodiments, the surface-modified silicone roofing material comprises a silicone roofing membrane. In some embodiments, the silicone roofing membrane comprises a silicone coating having a modified top surface. In some embodiments, the modified top surface of the silicone coating is an outermost surface of the silicone roofing membrane. In some embodiments, the silicone roofing membrane comprises a plurality of particles and/or a surface layer located on a top or outermost surface of the silicone coating of the roofing membrane. In some embodiments, the plurality of particles and/or surface layer, when applied to an uncured silicone coating which is subsequently cured, unexpectedly improves one or more properties of the silicone roofing membrane. For example, in some embodiments, the modified top surface of the silicone roofing membrane improves at least one of compatibility with adhesives, walkability and/or traction when installed on a roofing substrate, abrasion resistance, cleanliness and/or resistance to debris pickup, aesthetics, or any combination thereof.

As used herein, the term "top surface" refers to a surface that is a top surface when the roofing membrane is installed on a roofing substrate. In some embodiments, the top surface is a surface of an outermost top layer. In some embodiments, the top surface is a surface that is exposed or at least partially exposed to an environment. In some embodiments, a surface is exposed or at least partially exposed to an environment when the surface or at least a portion of the surface is subjected to conditions of an environment (e.g., weather, such as, for example and without limitation, precipitation (e.g., rain, snow, etc.), temperature variations, humidity, sunlight, wind, etc.).

As used herein, the term "bottom surface" refers to a surface that is a bottom surface when the roofing membrane is installed on a roofing substrate. In some embodiments, the bottom surface is a surface of an outermost bottom layer. In some embodiments, the bottom surface is a surface that is not exposed to an environment or at least exposed to a lesser extent than the top surface.

Some embodiments relate to a roofing membrane. In some embodiments, the roofing membrane is provided in a form of a roll. For example, in some embodiments, a roll comprises a roofing membrane, wherein at least a portion of a first surface of the roofing membrane contacts at least a portion of a second surface of the roofing membrane, wherein the second surface of the roofing membrane is opposite the first surface of the roofing membrane. In some embodiments, a roll comprises a roofing membrane, wherein at least a portion of a bottom surface of the roofing membrane contacts at least a portion of a top surface of the roofing membrane, wherein the top surface of the roofing membrane is opposite the bottom surface of the roofing membrane. In some embodiments, the roofing membrane is not provided in the form of a roll of a roofing membrane. For example, in some embodiments, the roofing membrane is provided in a form of stacked roofing membranes, wherein at least a portion of a bottom surface of the roofing membrane contacts at least a portion of a top surface of another roofing membrane.

In some embodiments, the roofing membrane comprises a substrate. As used herein, the term "substrate" refers to any layer which is not a silicone coating as disclosed herein and/or which is not an adhesive layer as disclosed herein. In some embodiments, the substrate is a reinforcement layer. In some embodiments, the substrate is a support layer. In some embodiments, the substrate comprises at least one of a mesh, a fabric, a fleece, a mat, a scrim, a coated scrim, a woven, a non-woven, or any combination thereof. In some embodiments, the substrate comprises at least one of a spunbond mat, a spunlaced mat, an airlaid mat, a meltblown mat, or any combination thereof. In some embodiments, the substrate comprises a fibrous material, wherein the fibrous material comprises at least one of a natural fiber, a synthetic fiber, or any combination thereof. In some embodiments, the substrate comprises at least one of a polyolefin (e.g., at least one of a polyethylene, a polypropylene, any copolymer thereof, any blend thereof, or any combination thereof), a polyester, a polyamide, a glass, a fiberglass, or any combination thereof.

In some embodiments, the substrate has a thickness of 1 mil to 200 mils. In some embodiments, the substrate has a thickness of 10 mils to 200 mils. In some embodiments, the substrate has a thickness of 20 mils to 200 mils. In some embodiments, the substrate has a thickness of 30 mils to 200 mils. In some embodiments, the substrate has a thickness of 40 mils to 200 mils. In some embodiments, the substrate has a thickness of 50 mils to 200 mils. In some embodiments, the substrate has a thickness of 60 mils to 200 mils. In some embodiments, the substrate has a thickness of 70 mils to 200 mils. In some embodiments, the substrate has a thickness of 80 mils to 200 mils. In some embodiments, the substrate has a thickness of 90 mils to 200 mils. In some embodiments, the substrate has a thickness of 100 mils to 200 mils. In some embodiments, the substrate has a thickness of 110 mils to 200 mils. In some embodiments, the substrate has a thickness of 120 mils to 200 mils. In some embodiments, the substrate has a thickness of 130 mils to 200 mils. In some embodiments, the substrate has a thickness of 140 mils to 200 mils. In some embodiments, the substrate has a thickness of 150 mils to 200 mils. In some embodiments, the substrate has a thickness of 160 mils to 200 mils. In some embodiments, the substrate has a thickness of 170 mils to 200 mils. In some embodiments, the substrate has a thickness of 180 mils to 200 mils. In some embodiments, the substrate has a thickness of 190 mils to 200 mils.

In some embodiments, the substrate has a thickness of 1 mil to 190 mils. In some embodiments, the substrate has a thickness of 1 mil to 180 mils. In some embodiments, the substrate has a thickness of 1 mil to 170 mils. In some embodiments, the substrate has a thickness of 1 mil to 160 mils. In some embodiments, the substrate has a thickness of 1 mil to 150 mils. In some embodiments, the substrate has a thickness of 1 mil to 140 mils. In some embodiments, the substrate has a thickness of 1 mil to 130 mils. In some embodiments, the substrate has a thickness of 1 mil to 120 mils. In some embodiments, the substrate has a thickness of 1 mil to 110 mils. In some embodiments, the substrate has a thickness of 1 mil to 100 mils. In some embodiments, the substrate has a thickness of 1 mil to 90 mils. In some embodiments, the substrate has a thickness of 1 mil to 80 mils. In some embodiments, the substrate has a thickness of 1 mil to 70 mils. In some embodiments, the substrate has a thickness of 1 mil to 60 mils. In some embodiments, the substrate has a thickness of 1 mil to 50 mils. In some embodiments, the substrate has a thickness of 1 mil to 40 mils. In some embodiments, the substrate has a thickness of 1 mil to 30 mils. In some embodiments, the substrate has a thickness of 1 mil to 20 mils. In some embodiments, the substrate has a thickness of 1 mil to 10 mils.

In some embodiments, the roofing membrane comprises a silicone coating. In some embodiments, the silicone coating is a multi-layered silicone coating, wherein the multi-layered silicone coating comprises at least two layers of a silicone coating. In some embodiments, the multi-layered silicone coating comprises 1 to 1000 layers of a silicone coating, or any range or subrange between 1 and 1000 layers of a silicone coating. For example, in some embodiments, the multi-layered silicone coating comprises a first layer, a second layer, a third layer, a fourth layer, a fifth layer, a sixth layer, a seventh layer, an eighth layer, a ninth layer, a tenth layer, or any combination thereof. In some embodiments, at least two layers of the multi-layered silicone coating are the same. In some embodiments, at least two layers of the multi-layered silicone coating are different. In some embodiments, the silicone coating comprises a cured silicone coating or at least one cured layer of a silicone coating.

In some embodiments, the silicone coating is located on the first surface of the substrate. In some embodiments, the silicone coating covers at least a portion of the first surface of the substrate. In some embodiments, the silicone coating directly contacts at least a portion of the first surface of the substrate. In some embodiments, the silicone coating is pressed into at least a portion of the first surface of the substrate. In some embodiments, the silicone coating is embedded into at least a portion of the first surface of the substrate. In some embodiments, an intervening layer is located between the silicone coating and the first surface of the substrate. In some embodiments, the silicone coating is adhered to the first surface of the substrate by an adhesive layer. In some embodiments, the first surface is the top surface of the substrate.

In some embodiments, the silicone coating is located on the second surface of the substrate. In some embodiments, the silicone coating covers at least a portion of the second surface of the substrate. In some embodiments, the silicone coating directly contacts at least a portion of the second surface of the substrate. In some embodiments, the silicone coating is pressed into at least a portion of the second surface of the substrate. In some embodiments, the silicone coating is embedded into at least a portion of the second surface of the substrate. In some embodiments, an intervening layer is located between the silicone coating and the second surface of the substrate. In some embodiments, the silicone coating is adhered to the second surface of the substrate by an adhesive layer. In some embodiments, the silicone coating is not located on the second surface of the substrate. In some embodiments, the second surface is the bottom surface of the substrate.

In some embodiments, the silicone coating covers 1% to 99% of a surface of the substrate. In some embodiments, the silicone coating covers 1% to 95% of a surface of the substrate. In some embodiments, the silicone coating covers 1% to 90% of a surface of the substrate. In some embodiments, the silicone coating covers 1% to 85% of a surface of the substrate. In some embodiments, the silicone coating covers 1% to 80% of a surface of the substrate. In some embodiments, the silicone coating covers 1% to 75% of a surface of the substrate. In some embodiments, the silicone coating covers 1% to 70% of a surface of the substrate. In some embodiments, the silicone coating covers 1% to 65% of a surface of the substrate. In some embodiments, the silicone coating covers 1% to 60% of a surface of the substrate. In some embodiments, the silicone coating covers 1% to 55% of a surface of the substrate. In some embodiments, the silicone coating covers 1% to 50% of a surface of the substrate. In some embodiments, the silicone coating covers 1% to 45% of a surface of the substrate. In some embodiments, the silicone coating covers 1% to 40% of a surface of the substrate. In some embodiments, the silicone coating covers 1% to 35% of a surface of the substrate. In some embodiments, the silicone coating covers 1% to 30% of a surface of the substrate. In some embodiments, the silicone coating covers 1% to 25% of a surface of the substrate. In some embodiments, the silicone coating covers 1% to 20% of a surface of the substrate. In some embodiments, the silicone coating covers 1% to 15% of a surface of the substrate. In some embodiments, the silicone coating covers 1% to 10% of a surface of the substrate. In some embodiments, the silicone coating covers 1% to 5% of a surface of the substrate.

In some embodiments, the silicone coating covers 5% to 99% of a surface of the substrate. In some embodiments, the silicone coating covers 10% to 99% of a surface of the substrate. In some embodiments, the silicone coating covers 15% to 99% of a surface of the substrate. In some embodiments, the silicone coating covers 20% to 99% of a surface of the substrate. In some embodiments, the silicone coating covers 25% to 99% of a surface of the substrate. In some embodiments, the silicone coating covers 30% to 99% of a surface of the substrate. In some embodiments, the silicone coating covers 35% to 99% of a surface of the substrate. In some embodiments, the silicone coating covers 40% to 99% of a surface of the substrate. In some embodiments, the silicone coating covers 45% to 99% of a surface of the substrate. In some embodiments, the silicone coating covers 50% to 99% of a surface of the substrate. In some embodiments, the silicone coating covers 55% to 99% of a surface of the substrate. In some embodiments, the silicone coating covers 60% to 99% of a surface of the substrate. In some embodiments, the silicone coating covers 65% to 99% of a surface of the substrate. In some embodiments, the silicone coating covers 70% to 99% of a surface of the substrate. In some embodiments, the silicone coating covers 75% to 99% of a surface of the substrate. In some embodiments, the silicone coating covers 80% to 99% of a surface of the substrate. In some embodiments, the silicone coating covers 85% to 99% of a surface of the substrate. In some embodiments, the silicone coating covers 90% to 99% of a surface of the substrate. In some embodiments, the silicone coating covers 95% to 99% of a surface of the substrate. In some embodiments, the silicone coating covers an entire surface of the substrate.

In some embodiments, the silicone coating has a thickness of 1 mil to 200 mils. In some embodiments, the silicone coating has a thickness of 10 mils to 200 mils. In some embodiments, the silicone coating has a thickness of 20 mils to 200 mils. In some embodiments, the silicone coating has a thickness of 30 mils to 200 mils. In some embodiments, the silicone coating has a thickness of 40 mils to 200 mils. In some embodiments, the silicone coating has a thickness of 50 mils to 200 mils. In some embodiments, the silicone coating has a thickness of 60 mils to 200 mils. In some embodiments, the silicone coating has a thickness of 70 mils to 200 mils. In some embodiments, the silicone coating has a thickness of 80 mils to 200 mils. In some embodiments, the silicone coating has a thickness of 90 mils to 200 mils. In some embodiments, the silicone coating has a thickness of 100 mils to 200 mils. In some embodiments, the silicone coating has a thickness of 110 mils to 200 mils. In some embodiments, the silicone coating has a thickness of 120 mils to 200 mils. In some embodiments, the silicone coating has a thickness of 130 mils to 200 mils. In some embodiments, the silicone coating has a thickness of 140 mils to 200 mils. In some embodiments, the silicone coating has a thickness of 150 mils to 200 mils. In some embodiments, the silicone coating has a thickness of 160 mils to 200 mils. In some embodiments, the silicone coating has a thickness of 170 mils to 200 mils. In some embodiments, the silicone coating has a thickness of 180 mils to 200 mils. In some embodiments, the silicone coating has a thickness of 190 mils to 200 mils.

In some embodiments, the silicone coating has a thickness of 1 mil to 190 mils. In some embodiments, the silicone coating has a thickness of 1 mil to 180 mils. In some embodiments, the silicone coating has a thickness of 1 mil to 170 mils. In some embodiments, the silicone coating has a thickness of 1 mil to 160 mils. In some embodiments, the silicone coating has a thickness of 1 mil to 150 mils. In some embodiments, the silicone coating has a thickness of 1 mil to 140 mils. In some embodiments, the silicone coating has a thickness of 1 mil to 130 mils. In some embodiments, the silicone coating has a thickness of 1 mil to 120 mils. In some embodiments, the silicone coating has a thickness of 1 mil to 110 mils. In some embodiments, the silicone coating has a thickness of 1 mil to 100 mils. In some embodiments, the silicone coating has a thickness of 1 mil to 90 mils. In some embodiments, the silicone coating has a thickness of 1 mil to 80 mils. In some embodiments, the silicone coating has a thickness of 1 mil to 70 mils. In some embodiments, the silicone coating has a thickness of 1 mil to 60 mils. In some embodiments, the silicone coating has a thickness of 1 mil to 50 mils. In some embodiments, the silicone coating has a thickness of 1 mil to 40 mils. In some embodiments, the silicone coating has a thickness of 1 mil to 30 mils. In some embodiments, the silicone coating has a thickness of 1 mil to 20 mils. In some embodiments, the silicone coating has a thickness of 1 mil to 10 mils.

In some embodiments, the silicone coating comprises at least one polymer. In some embodiments, the silicone coating comprises a crosslinked polymer.

In some embodiments, the silicone coating comprises 30% to 90% by weight of at least one polymer based on a total weight of the silicone coating. In some embodiments, the silicone coating comprises 35% to 90% by weight of at least one polymer based on a total weight of the silicone coating. In some embodiments, the silicone coating comprises 40% to 90% by weight of at least one polymer based on a total weight of the silicone coating. In some embodiments, the silicone coating comprises 45% to 90% by weight of at least one polymer based on a total weight of the silicone coating. In some embodiments, the silicone coating comprises 50% to 90% by weight of at least one polymer based on a total weight of the silicone coating. In some embodiments, the silicone coating comprises 55% to 90% by weight of at least one polymer based on a total weight of the silicone coating. In some embodiments, the silicone coating comprises 60% to 90% by weight of at least one polymer based on a total weight of the silicone coating. In some embodiments, the silicone coating comprises 65% to 90% by weight of at least one polymer based on a total weight of the silicone coating. In some embodiments, the silicone coating comprises 70% to 90% by weight of at least one polymer based on a total weight of the silicone coating. In some embodiments, the silicone coating comprises 75% to 90% by weight of at least one polymer based on a total weight of the silicone coating. In some embodiments, the silicone coating comprises 80% to 90% by weight of at least one polymer based on a total weight of the silicone coating. In some embodiments, the silicone coating comprises 85% to 90% by weight of at least one polymer based on a total weight of the silicone coating.

In some embodiments, the silicone coating comprises 30% to 85% by weight of at least one polymer based on a total weight of the silicone coating. In some embodiments, the silicone coating comprises 30% to 80% by weight of at least one polymer based on a total weight of the silicone coating. In some embodiments, the silicone coating comprises 30% to 75% by weight of at least one polymer based on a total weight of the silicone coating. In some embodiments, the silicone coating comprises 30% to 70% by weight of at least one polymer based on a total weight of the silicone coating. In some embodiments, the silicone coating comprises 30% to 65% by weight of at least one polymer based on a total weight of the silicone coating. In some embodiments, the silicone coating comprises 30% to 60% by weight of at least one polymer based on a total weight of the silicone coating. In some embodiments, the silicone coating comprises 30% to 55% by weight of at least one polymer based on a total weight of the silicone coating. In some embodiments, the silicone coating comprises 30% to 50% by weight of at least one polymer based on a total weight of the silicone coating. In some embodiments, the silicone coating comprises 30% to 45% by weight of at least one polymer based on a total weight of the silicone coating. In some embodiments, the silicone coating comprises 30% to 40% by weight of at least one polymer based on a total weight of the silicone coating. In some embodiments, the silicone coating comprises 30% to 35% by weight of at least one polymer based on a total weight of the silicone coating.

In some embodiments, the at least one polymer comprises at least one of a polysiloxane, a silyl-terminated polymer, or any combination thereof. In some embodiments, the at least one polymer comprises at least one of a linear polysiloxane, a cyclic polysiloxane, a branched polysiloxane, or any combination thereof. In some embodiments, the at least one polymer comprises at least one of a silyl-terminated polyurethane, a silyl-terminated polyether, a silyl-terminated acrylic, a silyl-terminated polyester, or any combination thereof. In some embodiments, the at least one polymer comprises at least one of polyester, polyethylene, polypropylene, polyurethane, polyurea, or any combination thereof. In some embodiments, the at least one polymer comprises at least one of a liquid silicone resin, a liquid silicone rubber resin (LSR), a heat cured silicone resin, a silicone gum, or any combination thereof. In some embodiments, the at least one polymer comprises at least one of a linear polysiloxane, a cyclic polysiloxane, a branched polysiloxane, polyester, polyethylene, polypropylene, polyurethane, polyurea, a liquid silicone resin, a liquid silicone rubber resin (LSR), a heat cured silicone resin, a silicone gum, a polyolefin, a polycarbonate, a polyether, a silyl-terminated polyurethane, a silyl-terminated polyether, a silyl-terminated acrylic, a silyl-terminated polyester, or any combination thereof.

In some embodiments, the at least one polymer comprises a polysiloxane. As used herein, a "polysiloxane" is a polymer that includes at least two of the following repeat units: —$R_2Si$—O—$SiR_2$—, where R is an organic group, or hydrogen. As used herein, an "organic group" may encompass any organosilicon group, such as but not limited to a silanol group or an alkyl silyl group. In some embodiments, each R is independently a hydrogen, an alkyl, an alkenyl, or an aryl. In some embodiments, each R is independently a hydrogen, a methyl, a phenyl, or a vinyl. In some embodiments, a terminal group of the polysiloxane is a terminal group of the formula: —$OSiR_3$, wherein each R is independently a hydrogen, an alkyl, an alkenyl, an aryl, or a hydroxyl. For example, in some embodiments, each R of the terminal group is independently a hydrogen, a methyl, a vinyl, or a hydroxyl. In some embodiments, a polysiloxane may include ten or more of the aforementioned repeat units. In some embodiments, a polysiloxane may include hundreds of the aforementioned repeat units. In some embodiments, a polysiloxane may include thousands of the aforementioned repeat units. In some embodiments, a polysiloxane may include tens-of-thousands of the aforementioned repeat units. In some embodiments, a polysiloxane may include hundreds-of-thousands of the aforementioned repeat units. In some embodiments, a polysiloxane may include millions of the aforementioned repeat units. As used herein, a "polysiloxane" may also include any version of the aforementioned formula where at least one of the R groups is substituted with an organic group. In some embodiments, the polysiloxane is unsubstituted, such that all of the R groups may be the same. In some embodiments, the polysiloxane is substituted such that some of the R groups may be the same while others may differ from each other. In some embodiments, the polysiloxane is substituted such that all of the R groups are different. In some embodiments, the polysiloxane is substituted or "terminated" with an organic group at the end of a polymer chain.

In some embodiments, the polysiloxane comprises or is selected from the group consisting of a hydroxy terminated polysiloxane, a di-hydroxy terminated polysiloxane, a vinyl terminated polysiloxane, a di-vinyl terminated polysiloxane, a tri-methyl-silyl terminated polysiloxane, a mono-trimethoxy terminated polysiloxane, a silanol terminated polysiloxane, or any combination thereof.

In some embodiments, the polysiloxane comprises, or is selected from the group consisting of a hydroxy terminated polysiloxane, a di-hydroxy terminated polysiloxane, a vinyl terminated polysiloxane, a di-vinyl terminated polysiloxane, a tri-methyl-silyl terminated polysiloxane, or any combination thereof.

In some embodiments, the polysiloxane comprises or is selected from the group consisting of a mono-trimethoxy terminated polysiloxane, a silanol terminated polysiloxane, or any combination thereof.

In some embodiments, the polysiloxane comprises, consists, or consists essentially of a mono-trimethoxy terminated polysiloxane. In some embodiments, the polysiloxane comprises, consists, or consists essentially of a silanol terminated polysiloxane.

As used herein, a "silane" is any compound having the general formula $Si_nR_{2n+2}$, where R is hydrogen, an organic group, or any combination thereof. As used herein, a "silane" may also include any version of the aforementioned formula where at least one of the R groups is substituted with an organic group. In some embodiments, the silane is unsubstituted, such that all of the R groups may be the same. In some embodiments, the silane is substituted such that some of the R groups may be the same while others may differ from each other. In some embodiments, the silane is substituted such that all of the R groups are different. Examples of at least one substituent R group may include, but is not limited to at least one amino group (in the non-limiting case of an aminosilane) and at least one methoxy group (in the non-limiting case of a methoxysilane).

In some embodiments, a silane may also encompass a bipodal silane. As used herein, a "bipodal silane" is a silane having the general formula $R_3Si$—R—$SiR_3$.

In some embodiments, the at least one silane comprises or is selected from the group consisting of an associative silane, a non-associative silane, or any combination thereof. In some embodiments, the at least one silane comprises, consists, or consists essentially of an associative silane. In some embodiments, the at least one silane comprises, consists, or consists essentially of a non-associative silane.

As used herein, an "associative silane" is a silane having the general formula $Si(R^1)_n(R^2)_{n+2}$; where each $R^1$ group is a crosslinkable functional group, such as but not limited to, an alkoxy group, acetoxy group, or an oxime group; and where at least one of the $R^2$ groups is a functional group that interacts with another $R^2$ group, interacts with another component in a silicone composition, or any combination thereof. In some embodiments, the interaction occurs by an interaction mechanism, such as but not limited to, hydrogen bonding, electrostatic attraction, TT-TT stacking, or any combination thereof.

As used herein a "non-associative silane" is any silane that is not an "associative silane."

In some embodiments, the associative silane comprises or is selected from the group consisting of an epoxysilane, an aminosilane, a diphenylsilane, or any combination thereof.

In some embodiments, the associative silane comprises or is selected from the group consisting of methacryloxypropyltrimethoxysilane, mercaptopropyltrimethoxysilane methacryloxypropylmethyldimethoxysilane, diphenyldimethoxysilane, an epoxy silane oligomer, glycidoxypropyltrimethoxysilane, aminoethylaminopropyltrimethoxysilane, or any combination thereof.

In some embodiments, the associative silane comprises or is selected from the group consisting of methacryloxypropyltrimethoxysilane, mercaptopropyltrimethoxysilane methacryloxypropylmethyldimethoxysilane, diphenyldimethoxysilane, an epoxy silane oligomer, or any combination thereof.

In some embodiments, the associative silane comprises or is selected from the group consisting of glycidoxypropyltrimethoxysilane, aminoethylaminopropyltrimethoxysilane, or any combination thereof.

In some embodiments, the associative silane comprises, consists, or consists essentially of glycidoxypropyltrimethoxysilane.

In some embodiments, the associative silane comprises, consists, or consists essentially of aminoethylaminopropyltrimethoxysilane.

In some embodiments, the non-associative silane is octylsilane.

In some embodiments, the non-associative silane comprises or is selected from the group consisting of octyltrimethoxysilane, vinyltrimethoxysilane, or any combination thereof.

In some embodiments, the non-associative silane is vinyltrimethoxysilane.

In some embodiments, the non-associative silane is octyltrimethoxysilane.

In some embodiments, the silicone composition comprises at least one bipodal silane. Non-limiting examples of a bipodal silane include bis(trimethoxysilylpropyl)amine (commercially available as Andisil® 1170) and bis[3-(triethoxysilyl)propyl] tetrasulfide (commercially available as Andisil® 1289).

In some embodiments, the silicone composition does not comprise a bipodal silane.

In some embodiments, the silicone composition may exclude certain specific bipodal silanes. For instance, in some embodiments, the silicone composition does not comprise bis-(triethoxysilyl) ethane, bis(trimethoxysilylpropyl) amine, bis[3-(triethoxysilyl)propyl] tetrasulfide, or any combination thereof.

In some embodiments, the polysiloxane comprises a silanol-terminated polysiloxane. In some embodiments, the polysiloxane comprises a silanol-terminated polydimethylsiloxane. In some embodiments, the polysiloxane comprises trimethylsilyl-terminated polydimethylsiloxane polymer.

Examples of hydroxyl-terminated polysiloxanes include, without limitation, Andisil® OH Polymers, such as, for example and without limitation, at least one of Andisil® OH 750 Silanol terminated 750 cps; Andisil® OH 1,000 Silanol terminated 1,000 cps; Andisil® OH 2,000 Silanol terminated 2,000 cps; Andisil® OH 3,500 Silanol terminated 3,500 cps; Andisil® OH 4,000 Silanol terminated 4,000 cps; Andisil® OH 6,000 Silanol terminated 6,000 cps; Andisil® OH 14,000 Silanol terminated 14,000 cps; Andisil® OH 20,000 Silanol terminated 20,000 cps; Andisil® OH 50,000 Silanol terminated 50,000 cps; Andisil® OH 80,000 Silanol terminated 80,000 cps; Andisil® OH 300,000 Silanol terminated 300,000 cps; or any combination thereof.

In some embodiments, the at least one polymer is derived from any one or more of the above polymers.

In some embodiments, the silicone coating comprises at least one of at least one silicone fluid, at least one filler, at least one fumed silica, at least one pigment, at least one crosslinker, at least one catalyst, at least one adhesion promoter, or any combination thereof.

In some embodiments, the silicone coating comprises a silicone fluid.

In some embodiments, the silicone coating comprises 1% to 30% by weight of the silicone fluid based on the total weight of the silicone coating. In some embodiments, the silicone coating comprises 2% to 30% by weight of the silicone fluid based on the total weight of the silicone coating. In some embodiments, the silicone coating comprises 4% to 30% by weight of the silicone fluid based on the total weight of the silicone coating. In some embodiments, the silicone coating comprises 5% to 30% by weight of the silicone fluid based on the total weight of the silicone coating. In some embodiments, the silicone coating comprises 6% to 30% by weight of the silicone fluid based on the total weight of the silicone coating. In some embodiments, the silicone coating comprises 8% to 30% by weight of the silicone fluid based on the total weight of the silicone coating. In some embodiments, the silicone coating comprises 10% to 30% by weight of the silicone fluid based on the total weight of the silicone coating. In some embodiments, the silicone coating comprises 12% to 30% by weight of the silicone fluid based on the total weight of the silicone coating. In some embodiments, the silicone coating comprises 14% to 30% by weight of the silicone fluid based on the total weight of the silicone coating. In some embodiments, the silicone coating comprises 15% to 30% by weight of the silicone fluid based on the total weight of the silicone coating. In some embodiments, the silicone coating comprises 16% to 30% by weight of the silicone fluid based on the total weight of the silicone coating. In some embodiments, the silicone coating comprises 18% to 30% by weight of the silicone fluid based on the total weight of the silicone coating. In some embodiments, the silicone coating comprises 20% to 30% by weight of the silicone fluid based on the total weight of the silicone coating. In some embodiments, the silicone coating comprises 22% to 30% by weight of the silicone fluid based on the total weight of the silicone coating. In some embodiments, the silicone coating comprises 24% to 30% by weight of the silicone fluid based on the total weight of the silicone coating. In some embodiments, the silicone coating comprises 25% to 30% by weight of the silicone fluid based on the total weight of the silicone coating. In some embodiments, the silicone coating comprises 26% to 30% by weight of the silicone fluid based on the total weight of the silicone coating. In some embodiments, the silicone coating comprises 28% to 30% by weight of the silicone fluid based on the total weight of the silicone coating.

In some embodiments, the silicone coating comprises 1% to 28% by weight of the silicone fluid based on the total weight of the silicone coating. In some embodiments, the silicone coating comprises 1% to 26% by weight of the silicone fluid based on the total weight of the silicone coating. In some embodiments, the silicone coating comprises 1% to 25% by weight of the silicone fluid based on the total weight of the silicone coating. In some embodiments, the silicone coating comprises 1% to 24% by weight of the silicone fluid based on the total weight of the silicone coating. In some embodiments, the silicone coating comprises 1% to 22% by weight of the silicone fluid based on the total weight of the silicone coating. In some embodiments, the silicone coating comprises 1% to 20% by weight of the silicone fluid based on the total weight of the silicone coating. In some embodiments, the silicone coating comprises 1% to 18% by weight of the silicone fluid based on the total weight of the silicone coating. In some embodiments, the silicone coating comprises 1% to 16% by weight of the silicone fluid based on the total weight of the silicone coating. In some embodiments, the silicone coating comprises 1% to 15% by weight of the silicone fluid based on the total weight of the silicone coating. In some embodiments, the silicone coating comprises 1% to 14% by weight of the silicone fluid based on the total weight of the silicone coating. In some embodiments, the silicone coating comprises 1% to 12% by weight of the silicone fluid based on the total weight of the silicone coating. In some embodiments, the silicone coating comprises 1% to 10% by weight of the silicone fluid based on the total weight of the silicone coating. In some embodiments, the silicone coating comprises 1% to 8% by weight of the silicone fluid based on the total weight of the silicone coating. In some embodiments, the silicone coating comprises 1% to 6% by weight of the silicone fluid based on the total weight of the silicone coating. In some embodiments, the silicone coating comprises 1% to 5% by weight of the silicone fluid based on the total weight of the silicone coating. In some embodiments, the silicone coating comprises 1% to 4% by weight of the silicone fluid based on the total weight of the silicone coating. In some embodiments, the silicone coating comprises 1% to 2% by weight of the silicone fluid based on the total weight of the silicone coating.

In some embodiments, the silicone fluid comprises an inert silicone fluid. In some embodiments, the silicone fluid comprises at least one of a linear silicone, a cyclic silicone, a branched silicone, or any combination thereof. In some embodiments, the silicone fluid comprises at least one of octamethylcyclotetrasiloxane, decamethylcyclopentasiloxane, trimethylsilyl terminated linear polydimethylsiloxane, or any combination thereof.

In some embodiments, the silicone coating comprises at least one filler.

In some embodiments, the silicone coating comprises 1% to 70% by weight of the at least one filler based on the total weight of the silicone coating. In some embodiments, the silicone coating comprises 5% to 70% by weight of the at least one filler based on the total weight of the silicone coating. In some embodiments, the silicone coating comprises 10% to 70% by weight of the at least one filler based on the total weight of the silicone coating. In some embodiments, the silicone coating comprises 15% to 70% by weight of the at least one filler based on the total weight of the silicone coating. In some embodiments, the silicone coating comprises 20% to 70% by weight of the at least one filler based on the total weight of the silicone coating. In some embodiments, the silicone coating comprises 25% to 70% by weight of the at least one filler based on the total weight of the silicone coating. In some embodiments, the silicone coating comprises 30% to 70% by weight of the at least one filler based on the total weight of the silicone coating. In some embodiments, the silicone coating comprises 35% to 70% by weight of the at least one filler based on the total weight of the silicone coating. In some embodiments, the silicone coating comprises 40% to 70% by weight of the at least one filler based on the total weight of the silicone coating. In some embodiments, the silicone coating comprises 45% to 70% by weight of the at least one filler based on the total weight of the silicone coating. In some embodiments, the silicone coating comprises 50% to 70% by weight of the at least one filler based on the total weight of the silicone coating. In some embodiments, the silicone coating comprises 55% to 70% by weight of the at least one filler based on the total weight of the silicone coating. In some embodiments, the silicone coating comprises 60% to 70% by weight of the at least one filler based on the total weight of the silicone coating. In some embodiments, the silicone coating comprises 65% to 70% by weight of the at least one filler based on the total weight of the silicone coating.

In some embodiments, the silicone coating comprises 1% to 65% by weight of the at least one filler based on the total weight of the silicone coating. In some embodiments, the silicone coating comprises 1% to 60% by weight of the at least one filler based on the total weight of the silicone coating. In some embodiments, the silicone coating comprises 1% to 55% by weight of the at least one filler based on the total weight of the silicone coating. In some embodiments, the silicone coating comprises 1% to 50% by weight of the at least one filler based on the total weight of the silicone coating. In some embodiments, the silicone coating comprises 1% to 45% by weight of the at least one filler based on the total weight of the silicone coating. In some embodiments, the silicone coating comprises 1% to 40% by weight of the at least one filler based on the total weight of the silicone coating. In some embodiments, the silicone coating comprises 1% to 35% by weight of the at least one filler based on the total weight of the silicone coating. In some embodiments, the silicone coating comprises 1% to 30% by weight of the at least one filler based on the total weight of the silicone coating. In some embodiments, the silicone coating comprises 1% to 25% by weight of the at least one filler based on the total weight of the silicone coating. In some embodiments, the silicone coating comprises 1% to 20% by weight of the at least one filler based on the total weight of the silicone coating. In some embodiments, the silicone coating comprises 1% to 15% by weight of the at least one filler based on the total weight of the silicone coating. In some embodiments, the silicone coating comprises 1% to 10% by weight of the at least one filler based on the total weight of the silicone coating. In some embodiments, the silicone coating comprises 1% to 5% by weight of the at least one filler based on the total weight of the silicone coating.

In some embodiments, the at least one filler comprises at least one of nepheline syenite, calcium carbonate, barium sulfate, iron oxide, diatomaceous earth, melamine, quartz, silica, colloidal silica, crystalline silica, precipitated silica, amorphous silica, titanium dioxide, alumina trihydrate, zinc oxide, zirconium oxide, zirconium silicate, zinc borate, chromic oxide, crystalline silica fine powder, amorphous silica fine powder, silicone rubber powder, glass, glass bubbles, glass powder, zeolites, silica hydrogen, silica aero gel, calcium silicate, aluminum silicate, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum, slaked lime, or any combination thereof.

In some embodiments, the silicone coating comprises a fumed silica.

In some embodiments, the silicone coating comprises 0.1% to 20% by weight of the fumed silica based on the total weight of the silicone coating. In some embodiments, the silicone coating comprises 0.5% to 20% by weight of the fumed silica based on the total weight of the silicone coating. In some embodiments, the silicone coating comprises 1% to 20% by weight of the fumed silica based on the total weight of the silicone coating.

In some embodiments, the silicone coating comprises 2% to 20% by weight of the fumed silica based on the total weight of the silicone coating. In some embodiments, the silicone coating comprises 4% to 20% by weight of the fumed silica based on the total weight of the silicone coating. In some embodiments, the silicone coating comprises 5% to 20% by weight of the fumed silica based on the total weight of the silicone coating. In some embodiments, the silicone coating comprises 6% to 20% by weight of the fumed silica based on the total weight of the silicone coating. In some embodiments, the silicone coating comprises 8% to 20% by weight of the fumed silica based on the total weight of the silicone coating. In some embodiments, the silicone coating comprises 10% to 20% by weight of the fumed silica based on the total weight of the silicone coating. In some embodiments, the silicone coating comprises 12% to 20% by weight of the fumed silica based on the total weight of the silicone coating. In some embodiments, the silicone coating comprises 14% to 20% by weight of the fumed silica based on the total weight of the silicone coating. In some embodiments, the silicone coating comprises 15% to 20% by weight of the fumed silica based on the total weight of the silicone coating. In some embodiments, the silicone coating comprises 16% to 20% by weight of the fumed silica based on the total weight of the silicone coating. In some embodiments, the silicone coating comprises 18% to 20% by weight of the fumed silica based on the total weight of the silicone coating.

In some embodiments, the silicone coating comprises 0.1% to 18% by weight of the fumed silica based on the total weight of the silicone coating. In some embodiments, the silicone coating comprises 0.1% to 16% by weight of the fumed silica based on the total weight of the silicone coating. In some embodiments, the silicone coating comprises 0.1% to 15% by weight of the fumed silica based on the total weight of the silicone coating. In some embodiments, the silicone coating comprises 0.1% to 14% by weight of the fumed silica based on the total weight of the silicone coating. In some embodiments, the silicone coating comprises 0.1% to 12% by weight of the fumed silica based on the total weight of the silicone coating. In some embodiments, the silicone coating comprises 0.1% to 10% by weight of the fumed silica based on the total weight of the silicone coating. In some embodiments, the silicone coating comprises 0.1% to 8% by weight of the fumed silica based on the total weight of the silicone coating. In some embodiments, the silicone coating comprises 0.1% to 6% by weight of the fumed silica based on the total weight of the silicone coating. In some embodiments, the silicone coating comprises 0.1% to 5% by weight of the fumed silica based on the total weight of the silicone coating. In some embodiments, the silicone coating comprises 0.1% to 4% by weight of the fumed silica based on the total weight of the silicone coating. In some embodiments, the silicone coating comprises 0.1% to 2% by weight of the fumed silica based on the total weight of the silicone coating. In some embodiments, the silicone coating comprises 0.1% to 1% by weight of the fumed silica based on the total weight of the silicone coating. In some embodiments, the silicone coating comprises 0.1% to 0.8% by weight of the fumed silica based on the total weight of the silicone coating. In some embodiments, the silicone coating comprises 0.1% to 0.6% by weight of the fumed silica based on the total weight of the silicone coating. In some embodiments, the silicone coating comprises 0.1% to 0.5% by weight of the fumed silica based on the total weight of the silicone coating. In some embodiments, the silicone coating comprises 0.1% to 0.4% by weight of the fumed silica based on the total weight of the silicone coating. In some embodiments, the silicone coating comprises 0.1% to 0.2% by weight of the fumed silica based on the total weight of the silicone coating.

In some embodiments, the fumed silica comprises at least one of a fumed silica powder, a modified fumed silica, a hydrophilic fumed silica, a hydrophobic fumed silica, or any combination thereof. In some embodiments, the fumed silica is after treated with dimethyldichlorosilane.

In some embodiments, the silicone coating comprises at least one pigment.

In some embodiments, the silicone coating comprises 1% to 20% by weight of the at least one pigment based on the total weight of the silicone coating. In some embodiments, the silicone coating comprises 2% to 20% by weight of the at least one pigment based on the total weight of the silicone coating. In some embodiments, the silicone coating comprises 4% to 20% by weight of the at least one pigment based on the total weight of the silicone coating. In some embodiments, the silicone coating comprises 5% to 20% by weight of the at least one pigment based on the total weight of the silicone coating. In some embodiments, the silicone coating comprises 6% to 20% by weight of the at least one pigment based on the total weight of the silicone coating. In some embodiments, the silicone coating comprises 8% to 20% by weight of the at least one pigment based on the total weight of the silicone coating. In some embodiments, the silicone coating comprises 10% to 20% by weight of the at least one pigment based on the total weight of the silicone coating. In some embodiments, the silicone coating comprises 12% to 20% by weight of the at least one pigment based on the total weight of the silicone coating. In some embodiments, the silicone coating comprises 14% to 20% by weight of the at least one pigment based on the total weight of the silicone coating. In some embodiments, the silicone coating comprises 15% to 20% by weight of the at least one pigment based on the total weight of the silicone coating. In some embodiments, the silicone coating comprises 16% to 20% by weight of the at least one pigment based on the total weight of the silicone coating. In some embodiments, the silicone coating comprises 18% to 20% by weight of the at least one pigment based on the total weight of the silicone coating.

In some embodiments, the silicone coating comprises 1% to 18% by weight of the at least one pigment based on the total weight of the silicone coating. In some embodiments, the silicone coating comprises 1% to 16% by weight of the at least one pigment based on the total weight of the silicone coating. In some embodiments, the silicone coating comprises 1% to 15% by weight of the at least one pigment based on the total weight of the silicone coating. In some embodiments, the silicone coating comprises 1% to 14% by weight of the at least one pigment based on the total weight of the silicone coating. In some embodiments, the silicone coating comprises 1% to 12% by weight of the at least one pigment based on the total weight of the silicone coating. In some embodiments, the silicone coating comprises 1% to 10% by weight of the at least one pigment based on the total weight of the silicone coating. In some embodiments, the silicone coating comprises 1% to 8% by weight of the at least one pigment based on the total weight of the silicone coating. In some embodiments, the silicone coating comprises 1% to 6% by weight of the at least one pigment based on the total weight of the silicone coating. In some embodiments, the silicone coating comprises 1% to 5% by weight of the at least one pigment based on the total weight of the silicone coating. In some embodiments, the silicone coating comprises 1% to 4% by weight of the at least one pigment based on the total weight of the silicone coating. In some embodiments, the silicone coating comprises 1% to 2% by weight of the at least one pigment based on the total weight of the silicone coating.

In some embodiments, the at least one pigment comprises at least one of zinc oxide, antimony oxide, zirconium oxide, chromium oxide, iron oxide, lead oxide, zinc sulfide, titanium dioxide (anatase, rutile, or brookite), lithopone, and carbon black, or any combination thereof.

In some embodiments, the silicone coating comprises at least one crosslinker.

In some embodiments, the silicone coating comprises 1% to 25% by weight of the at least one crosslinker based on the total weight of the silicone coating. In some embodiments, the silicone coating comprises 2% to 25% by weight of the at least one crosslinker based on the total weight of the silicone coating. In some embodiments, the silicone coating comprises 4% to 25% by weight of the at least one crosslinker based on the total weight of the silicone coating. In some embodiments, the silicone coating comprises 5% to 25% by weight of the at least one crosslinker based on the total weight of the silicone coating. In some embodiments, the silicone coating comprises 6% to 25% by weight of the at least one crosslinker based on the total weight of the silicone coating. In some embodiments, the silicone coating comprises 8% to 25% by weight of the at least one crosslinker based on the total weight of the silicone coating. In some embodiments, the silicone coating comprises 10% to 25% by weight of the at least one crosslinker based on the total weight of the silicone coating. In some embodiments, the silicone coating comprises 12% to 25% by weight of the at least one crosslinker based on the total weight of the silicone coating. In some embodiments, the silicone coating comprises 14% to 25% by weight of the at least one crosslinker based on the total weight of the silicone coating. In some embodiments, the silicone coating comprises 15% to 25% by weight of the at least one crosslinker based on the total weight of the silicone coating. In some embodiments, the silicone coating comprises 16% to 25% by weight of the at least one crosslinker based on the total weight of the silicone coating. In some embodiments, the silicone coating comprises 18% to 25% by weight of the at least one crosslinker based on the total weight of the silicone coating. In some embodiments, the silicone coating comprises 20% to 25% by weight of the at least one crosslinker based on the total weight of the silicone coating. In some embodiments, the silicone coating comprises 22% to 25% by weight of the at least one crosslinker based on the total weight of the silicone coating. In some embodiments, the silicone coating comprises 24% to 25% by weight of the at least one crosslinker based on the total weight of the silicone coating.

In some embodiments, the silicone coating comprises 1% to 24% by weight of the at least one crosslinker based on the total weight of the silicone coating. In some embodiments, the silicone coating comprises 1% to 22% by weight of the at least one crosslinker based on the total weight of the silicone coating. In some embodiments, the silicone coating comprises 1% to 20% by weight of the at least one crosslinker based on the total weight of the silicone coating. In some embodiments, the silicone coating comprises 1% to 18% by weight of the at least one crosslinker based on the total weight of the silicone coating. In some embodiments, the silicone coating comprises 1% to 16% by weight of the at least one crosslinker based on the total weight of the silicone coating. In some embodiments, the silicone coating comprises 1% to 15% by weight of the at least one crosslinker based on the total weight of the silicone coating. In some embodiments, the silicone coating comprises 1% to 14% by weight of the at least one crosslinker based on the total weight of the silicone coating. In some embodiments, the silicone coating comprises 1% to 12% by weight of the at least one crosslinker based on the total weight of the silicone coating. In some embodiments, the silicone coating comprises 1% to 10% by weight of the at least one crosslinker based on the total weight of the silicone coating. In some embodiments, the silicone coating comprises 1% to 8% by weight of the at least one crosslinker based on the total weight of the silicone coating. In some embodiments, the silicone coating comprises 1% to 6% by weight of the at least one crosslinker based on the total weight of the silicone coating. In some embodiments, the silicone coating comprises 1% to 5% by weight of the at least one crosslinker based on the total weight of the silicone coating. In some embodiments, the silicone coating comprises 1% to 4% by weight of the at least one crosslinker based on the total weight of the silicone coating. In some embodiments, the silicone coating comprises 1% to 2% by weight of the at least one crosslinker based on the total weight of the silicone coating.

In some embodiments, the at least one crosslinker comprises a neutral curing agent. In some embodiments, the at least one crosslinker comprises at least one of ketoxime silanes, alkoxysilanes, acetoxysilanes, isopropenoxy silanes, a partial hydrolysate/condensate of said silanes, or any combination thereof. In some embodiments, the at least one crosslinker comprises an organosilane, which may contain at least 2 or at least 3 hydrolyzable groups in one molecule and/or its partial hydrolysate. In some embodiments, a hydrolyzable group in such an organosilane or its partial hydrolysate includes at least one of a ketoxime group, an alkoxy group, an acetoxy group, an isopropenoxy group, or any combination thereof. In some embodiments, the at least one crosslinker comprises an organic titanate, a thermal radical initiator, a UV radical initiator, or any combination thereof. In some embodiments, the at least one crosslinker comprises ketoxime silanes. In some embodiments, a ketoxime silane comprises at least one of tetrakis(methylethylketoxime)silane, methyltris(dimethylketoxime)silane, methyltris(methylethylketoxime)silane, ethyltris(methylethylketoxime)silane, methyltris(methyl isobutyl ketoxime)silane, vinyl tris(methylethylketoxime)silane or any combination thereof. In some embodiments, the at least one crosslinker comprises an alkoxysilane. In some embodiments, the alkoxysilane comprises at least one of methyltrimethoxysilane, vinyltrimethoxysilane, phenyltrimethoxysilane, vinyltriethoxy silane, or any combination thereof. In some embodiments, the at least one crosslinker comprises an acetoxysilane. In some embodiments, the acetoxysilane comprises at least one of methyltriacetoxysilane, vinyltriac-etoxysilane, or any combination thereof. In some embodiments, the at least one crosslinker comprises an isoprope-noxy silane. In some embodiments, the isopropenoxy silane comprises at least one of methyltriisopropenoxysilane, vinyltriisopropenoxysilane, phenyltriisopropenoxysilane, or any combination thereof. In some embodiments, the at least one crosslinker comprises a partial hydrolysate/condensate of any one of the silanes disclosed herein. In some embodiments, the at least one crosslinker comprises at least one of methyltris(methylethylketoxime)silane, vinyltris(methyleth-ylketoxime)silane, or any combination thereof.

In some embodiments, the silicone coating comprises at least one catalyst.

In some embodiments, the silicone coating comprises 0.1% to 15% by weight of the at least one catalyst based on the total weight of the silicone coating. In some embodi-ments, the silicone coating comprises 0.5% to 15% by weight of the at least one catalyst based on the total weight of the silicone coating. In some embodiments, the silicone coating comprises 1% to 15% by weight of the at least one catalyst based on the total weight of the silicone coating. In some embodiments, the silicone coating comprises 2% to 15% by weight of the at least one catalyst based on the total weight of the silicone coating. In some embodiments, the silicone coating comprises 4% to 15% by weight of the at least one catalyst based on the total weight of the silicone coating. In some embodiments, the silicone coating com-prises 5% to 15% by weight of the at least one catalyst based on the total weight of the silicone coating. In some embodi-ments, the silicone coating comprises 6% to 15% by weight of the at least one catalyst based on the total weight of the silicone coating. In some embodiments, the silicone coating comprises 8% to 15% by weight of the at least one catalyst based on the total weight of the silicone coating. In some embodiments, the silicone coating comprises 10% to 15% by weight of the at least one catalyst based on the total weight of the silicone coating. In some embodiments, the silicone coating comprises 12% to 15% by weight of the at least one catalyst based on the total weight of the silicone coating. In some embodiments, the silicone coating com-prises 14% to 15% by weight of the at least one catalyst based on the total weight of the silicone coating.

In some embodiments, the silicone coating comprises 0.1% to 14% by weight of the at least one catalyst based on the total weight of the silicone coating. In some embodi-ments, the silicone coating comprises 0.1% to 12% by weight of the at least one catalyst based on the total weight of the silicone coating. In some embodiments, the silicone coating comprises 0.1% to 10% by weight of the at least one catalyst based on the total weight of the silicone coating. In some embodiments, the silicone coating comprises 0.1% to 8% by weight of the at least one catalyst based on the total weight of the silicone coating. In some embodiments, the silicone coating comprises 0.1% to 6% by weight of the at least one catalyst based on the total weight of the silicone coating. In some embodiments, the silicone coating com-prises 0.1% to 5% by weight of the at least one catalyst based on the total weight of the silicone coating. In some embodiments, the silicone coating comprises 0.1% to 4% by weight of the at least one catalyst based on the total weight of the silicone coating. In some embodiments, the silicone coating comprises 0.1% to 2% by weight of the at least one catalyst based on the total weight of the silicone coating. In some embodiments, the silicone coating comprises 0.1% to 1% by weight of the at least one catalyst based on the total weight of the silicone coating. In some embodiments, the silicone coating comprises 0.1% to 0.8% by weight of the at least one catalyst based on the total weight of the silicone coating. In some embodiments, the silicone coating com-prises 0.1% to 0.6% by weight of the at least one catalyst based on the total weight of the silicone coating. In some embodiments, the silicone coating comprises 0.1% to 0.5% by weight of the at least one catalyst based on the total weight of the silicone coating. In some embodiments, the silicone coating comprises 0.1% to 0.4% by weight of the at least one catalyst based on the total weight of the silicone coating. In some embodiments, the silicone coating com-prises 0.1% to 0.2% by weight of the at least one catalyst based on the total weight of the silicone coating.

In some embodiments, the at least one catalyst comprises at least one of an organic tin, an organic platinum, trietha-nolamine titanate, dimethyltin dioleate, dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dim-ethyltin diacetate, dioctyltin dioctate, dioctyltin dilaurate, tin dioctate, tin laurate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diiso-propoxy titanium bisethyl acetoacetate, di-tertiary butoxy titanium bisethyl acetoacetate, di-tertiary butoxy titanium bismethyl acetoacetate, or any combination thereof.

In some embodiments, the silicone coating comprises at least one adhesion promoter.

In some embodiments, the silicone coating comprises 0.1% to 20% by weight of the at least one adhesion promoter based on the total weight of the silicone coating. In some embodiments, the silicone coating comprises 0.5% to 20% by weight of the at least one adhesion promoter based on the total weight of the silicone coating. In some embodiments, the silicone coating comprises 1% to 20% by weight of the at least one adhesion promoter based on the total weight of the silicone coating. In some embodiments, the silicone coating comprises 2% to 20% by weight of the at least one adhesion promoter based on the total weight of the silicone coating. In some embodiments, the silicone coating com-prises 4% to 20% by weight of the at least one adhesion promoter based on the total weight of the silicone coating. In some embodiments, the silicone coating comprises 5% to 20% by weight of the at least one adhesion promoter based on the total weight of the silicone coating. In some embodi-ments, the silicone coating comprises 6% to 20% by weight of the at least one adhesion promoter based on the total weight of the silicone coating. In some embodiments, the silicone coating comprises 8% to 20% by weight of the at least one adhesion promoter based on the total weight of the silicone coating. In some embodiments, the silicone coating comprises 10% to 20% by weight of the at least one adhesion promoter based on the total weight of the silicone coating. In some embodiments, the silicone coating com-prises 12% to 20% by weight of the at least one adhesion promoter based on the total weight of the silicone coating. In some embodiments, the silicone coating comprises 14% to 20% by weight of the at least one adhesion promoter based on the total weight of the silicone coating. In some embodiments, the silicone coating comprises 15% to 20% by weight of the at least one adhesion promoter based on the total weight of the silicone coating. In some embodiments, the silicone coating comprises 16% to 20% by weight of the at least one adhesion promoter based on the total weight of the silicone coating. In some embodiments, the silicone coating comprises 18% to 20% by weight of the at least one adhesion promoter based on the total weight of the silicone coating.

In some embodiments, the silicone coating comprises 0.1% to 18% by weight of the at least one adhesion promoter based on the total weight of the silicone coating. In some embodiments, the silicone coating comprises 0.1% to 16% by weight of the at least one adhesion promoter based on the total weight of the silicone coating. In some embodiments, the silicone coating comprises 0.1% to 15% by weight of the at least one adhesion promoter based on the total weight of the silicone coating. In some embodiments, the silicone coating comprises 0.1% to 14% by weight of the at least one adhesion promoter based on the total weight of the silicone coating. In some embodiments, the silicone coating comprises 0.1% to 12% by weight of the at least one adhesion promoter based on the total weight of the silicone coating. In some embodiments, the silicone coating comprises 0.1% to 10% by weight of the at least one adhesion promoter based on the total weight of the silicone coating. In some embodiments, the silicone coating comprises 0.1% to 8% by weight of the at least one adhesion promoter based on the total weight of the silicone coating. In some embodiments, the silicone coating comprises 0.1% to 6% by weight of the at least one adhesion promoter based on the total weight of the silicone coating. In some embodiments, the silicone coating comprises 0.1% to 5% by weight of the at least one adhesion promoter based on the total weight of the silicone coating. In some embodiments, the silicone coating comprises 0.1% to 4% by weight of the at least one adhesion promoter based on the total weight of the silicone coating. In some embodiments, the silicone coating comprises 0.1% to 2% by weight of the at least one adhesion promoter based on the total weight of the silicone coating. In some embodiments, the silicone coating comprises 0.1% to 1% by weight of the at least one adhesion promoter based on the total weight of the silicone coating. In some embodiments, the silicone coating comprises 0.1% to 0.8% by weight of the at least one adhesion promoter based on the total weight of the silicone coating. In some embodiments, the silicone coating comprises 0.1% to 0.6% by weight of the at least one adhesion promoter based on the total weight of the silicone coating. In some embodiments, the silicone coating comprises 0.1% to 0.5% by weight of the at least one adhesion promoter based on the total weight of the silicone coating. In some embodiments, the silicone coating comprises 0.1% to 0.4% by weight of the at least one adhesion promoter based on the total weight of the silicone coating. In some embodiments, the silicone coating comprises 0.1% to 0.2% by weight of the at least one adhesion promoter based on the total weight of the silicone coating.

In some embodiments, the at least one adhesion promoter comprises at least one of dichlorodimethyl silane, a chlorinated polyolefin, an organosilane, an organotitanate, a zircoaluminate, a zirconate, an acrylate, an aryl phosphate ester, an alkyl phosphate ester, an aryl alkyl phosphate ester, a metal organic, a silica, a fumed silica, N-(2-aminoethyl)-3-aminopropyltrimethoxysilane, vinyl tris(2-methoxyethoxy)silane, 3-methacryloxypropyltrimethoxysilane, 2-(3, 4-epoxycyclohexyl)ethyl trimethoxysilane, 3-glycidoxypropyltrimethoxysilane, 3-glycidoxypropylmethyldiethoxysilane, N-(2-aminoethyl) 3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris (methylethylketoxime)silane, 3-glycidoxy propyltriisopropenoxysilane, 3-glycidoxypropylmethyldiisopropenoxysilane, any reaction product thereof, or any combination thereof. In some embodiments, the adhesion promoter is a reaction product of dichlorodimethylsilane and a silica agent. In some embodiments, the silica agent comprises a fumed silica. In some embodiments, the at least one adhesion promoter comprises at least one of tetraethyl orthosilicate, aminopropyltrimethoxysilane, or any combination thereof.

In some embodiments, the roofing membrane comprises a plurality of particles. In some embodiments, the plurality of particles is located on at least a portion of a surface of the silicone coating. In some embodiments, the silicone coating has a first surface and a second surface opposite the first surface. In some embodiments, the first surface is a top surface of the silicone coating. In some embodiments, the plurality of particles covers at least a portion of a surface of the silicone coating. In some embodiments, the plurality of particles directly contacts at least a portion of a surface of the silicone coating. In some embodiments, the plurality of particles is pressed into at least a portion of a surface of the silicone coating. In some embodiments, the plurality of particles is embedded into at least a portion of a surface of the silicone coating. In some embodiments, the surface of the silicone coating is the first surface of the silicone coating. In some embodiments, the surface of the silicone coating is the top surface of the silicone coating. In some embodiments, the roofing membrane comprises a particle layer, wherein the particle layer comprises a plurality of particles.

In some embodiments, the plurality of particles covers at least 50% of a surface of the silicone coating. In some embodiments, the plurality of particles covers at least 55% of a surface of the silicone coating. In some embodiments, the plurality of particles covers at least 60% of a surface of the silicone coating. In some embodiments, the plurality of particles covers at least 65% of a surface of the silicone coating. In some embodiments, the plurality of particles covers at least 70% of a surface of the silicone coating. In some embodiments, the plurality of particles covers at least 75% of a surface of the silicone coating. In some embodiments, the plurality of particles covers at least 80% of a surface of the silicone coating. In some embodiments, the plurality of particles covers at least 85% of a surface of the silicone coating. In some embodiments, the plurality of particles covers at least 90% of a surface of the silicone coating. In some embodiments, the plurality of particles covers at least 95% of a surface of the silicone coating. In some embodiments, the plurality of particles covers at least 99% of a surface of the silicone coating.

In some embodiments, the plurality of particles covers 50% to 99% of a surface of the silicone coating. In some embodiments, the plurality of particles covers 50% to 95% of a surface of the silicone coating. In some embodiments, the plurality of particles covers 50% to 90% of a surface of the silicone coating. In some embodiments, the plurality of particles covers 50% to 85% of a surface of the silicone coating. In some embodiments, the plurality of particles covers 50% to 80% of a surface of the silicone coating. In some embodiments, the plurality of particles covers 50% to 75% of a surface of the silicone coating. In some embodiments, the plurality of particles covers 50% to 70% of a surface of the silicone coating. In some embodiments, the plurality of particles covers 50% to 65% of a surface of the silicone coating. In some embodiments, the plurality of particles covers 50% to 60% of a surface of the silicone coating. In some embodiments, the plurality of particles covers 50% to 55% of a surface of the silicone coating.

In some embodiments, the plurality of particles covers 55% to 99% of a surface of the silicone coating. In some embodiments, the plurality of particles covers 60% to 99% of a surface of the silicone coating. In some embodiments, the plurality of particles covers 65% to 99% of a surface of the silicone coating. In some embodiments, the plurality of particles covers 70% to 99% of a surface of the silicone coating. In some embodiments, the plurality of particles covers 75% to 99% of a surface of the silicone coating. In some embodiments, the plurality of particles covers 80% to 99% of a surface of the silicone coating. In some embodiments, the plurality of particles covers 85% to 99% of a surface of the silicone coating. In some embodiments, the plurality of particles covers 90% to 99% of a surface of the silicone coating. In some embodiments, the plurality of particles covers 95% to 99% of a surface of the silicone coating. In some embodiments, the plurality of particles covers an entire top surface of the silicone coating.

In some embodiments, at least a portion of a surface of the silicone coating is exposed, between the plurality of particles, to an environment. In some embodiments, the portion of the surface of the silicone coating that is not covered by the plurality of particles is exposed, between the plurality of particles, to an environment. In some embodiments, an exposed portion of a surface of the silicone coating is a surface portion that is subjected to conditions of an environment (e.g., weather, such as, for example and without limitation, precipitation (e.g., rain, snow, etc.), temperature variations, humidity, sunlight, wind, etc.).

In some embodiments, the plurality of particles has an average particle size of 1 micron to 5000 microns. In some embodiments, the plurality of particles has an average particle size of 1 micron to 4800 microns. In some embodiments, the plurality of particles has an average particle size of 1 micron to 4600 microns. In some embodiments, the plurality of particles has an average particle size of 1 micron to 4400 microns. In some embodiments, the plurality of particles has an average particle size of 1 micron to 4200 microns. In some embodiments, the plurality of particles has an average particle size of 1 micron to 4000 microns. In some embodiments, the plurality of particles has an average particle size of 1 micron to 3800 microns. In some embodiments, the plurality of particles has an average particle size of 1 micron to 3600 microns. In some embodiments, the plurality of particles has an average particle size of 1 micron to 3400 microns. In some embodiments, the plurality of particles has an average particle size of 1 micron to 3200 microns. In some embodiments, the plurality of particles has an average particle size of 1 micron to 3000 microns. In some embodiments, the plurality of particles has an average particle size of 1 micron to 2800 microns. In some embodiments, the plurality of particles has an average particle size of 1 micron to 2600 microns. In some embodiments, the plurality of particles has an average particle size of 1 micron to 2400 microns. In some embodiments, the plurality of particles has an average particle size of 1 micron to 2200 microns. In some embodiments, the plurality of particles has an average particle size of 1 micron to 2000 microns. In some embodiments, the plurality of particles has an average particle size of 1 micron to 1800 microns. In some embodiments, the plurality of particles has an average particle size of 1 micron to 1600 microns. In some embodiments, the plurality of particles has an average particle size of 1 micron to 1400 microns. In some embodiments, the plurality of particles has an average particle size of 1 micron to 1200 microns. In some embodiments, the plurality of particles has an average particle size of 1 micron to 1000 microns. In some embodiments, the plurality of particles has an average particle size of 1 micron to 800 microns. In some embodiments, the plurality of particles has an average particle size of 1 micron to 600 microns. In some embodiments, the plurality of particles has an average particle size of 1 micron to 400 microns. In some embodiments, the plurality of particles has an average particle size of 1 micron to 200 microns. In some embodiments, the plurality of particles has an average particle size of 1 micron to 100 microns. In some embodiments, the plurality of particles has an average particle size of 1 micron to 50 microns.

In some embodiments, the plurality of particles has an average particle size of 100 microns to 5000 microns. In some embodiments, the plurality of particles has an average particle size of 200 microns to 5000 microns. In some embodiments, the plurality of particles has an average particle size of 400 microns to 5000 microns. In some embodiments, the plurality of particles has an average particle size of 600 microns to 5000 microns. In some embodiments, the plurality of particles has an average particle size of 800 microns to 5000 microns. In some embodiments, the plurality of particles has an average particle size of 1000 microns to 5000 microns. In some embodiments, the plurality of particles has an average particle size of 1200 microns to 5000 microns. In some embodiments, the plurality of particles has an average particle size of 1400 microns to 5000 microns. In some embodiments, the plurality of particles has an average particle size of 1600 microns to 5000 microns. In some embodiments, the plurality of particles has an average particle size of 1800 microns to 5000 microns. In some embodiments, the plurality of particles has an average particle size of 2000 microns to 5000 microns. In some embodiments, the plurality of particles has an average particle size of 2200 microns to 5000 microns. In some embodiments, the plurality of particles has an average particle size of 2400 microns to 5000 microns. In some embodiments, the plurality of particles has an average particle size of 2600 microns to 5000 microns. In some embodiments, the plurality of particles has an average particle size of 2800 microns to 5000 microns. In some embodiments, the plurality of particles has an average particle size of 3000 microns to 5000 microns. In some embodiments, the plurality of particles has an average particle size of 3200 microns to 5000 microns. In some embodiments, the plurality of particles has an average particle size of 3400 microns to 5000 microns. In some embodiments, the plurality of particles has an average particle size of 3600 microns to 5000 microns. In some embodiments, the plurality of particles has an average particle size of 3800 microns to 5000 microns. In some embodiments, the plurality of particles has an average particle size of 4000 microns to 5000 microns. In some embodiments, the plurality of particles has an average particle size of 4200 microns to 5000 microns. In some embodiments, the plurality of particles has an average particle size of 4400 microns to 5000 microns. In some embodiments, the plurality of particles has an average particle size of 4600 microns to 5000 microns. In some embodiments, the plurality of particles has an average particle size of 4800 microns to 5000 microns. In some embodiments, the plurality of particles has an average particle size of 50 microns to 1000 microns.

In some embodiments, the plurality of particles has an average length of 1 micron to 5000 microns. In some embodiments, the plurality of particles has an average length of 1 micron to 4800 microns. In some embodiments, the plurality of particles has an average length of 1 micron to 4600 microns. In some embodiments, the plurality of particles has an average length of 1 micron to 4400 microns. In some embodiments, the plurality of particles has an average length of 1 micron to 4200 microns. In some embodiments, the plurality of particles has an average length of 1 micron to 4000 microns.

In some embodiments, the plurality of particles has an average length of 1 micron to 3800 microns. In some embodiments, the plurality of particles has an average length of 1 micron to 3600 microns. In some embodiments, the plurality of particles has an average length of 1 micron to 3400 microns. In some embodiments, the plurality of particles has an average length of 1 micron to 3200 microns. In some embodiments, the plurality of particles has an average length of 1 micron to 3000 microns. In some embodiments, the plurality of particles has an average length of 1 micron to 2800 microns. In some embodiments, the plurality of particles has an average length of 1 micron to 2600 microns. In some embodiments, the plurality of particles has an average length of 1 micron to 2400 microns. In some embodiments, the plurality of particles has an average length of 1 micron to 2200 microns. In some embodiments, the plurality of particles has an average length of 1 micron to 2000 microns. In some embodiments, the plurality of particles has an average length of 1 micron to 1800 microns. In some embodiments, the plurality of particles has an average length of 1 micron to 1600 microns. In some embodiments, the plurality of particles has an average length of 1 micron to 1400 microns. In some embodiments, the plurality of particles has an average length of 1 micron to 1200 microns. In some embodiments, the plurality of particles has an average length of 1 micron to 1000 microns. In some embodiments, the plurality of particles has an average length of 1 micron to 800 microns. In some embodiments, the plurality of particles has an average length of 1 micron to 600 microns. In some embodiments, the plurality of particles has an average length of 1 micron to 400 microns. In some embodiments, the plurality of particles has an average length of 1 micron to 200 microns. In some embodiments, the plurality of particles has an average length of 1 micron to 100 microns. In some embodiments, the plurality of particles has an average length of 1 micron to 50 microns.

In some embodiments, the plurality of particles has an average length of 100 microns to 5000 microns. In some embodiments, the plurality of particles has an average length of 200 microns to 5000 microns. In some embodiments, the plurality of particles has an average length of 400 microns to 5000 microns. In some embodiments, the plurality of particles has an average length of 600 microns to 5000 microns. In some embodiments, the plurality of particles has an average length of 800 microns to 5000 microns. In some embodiments, the plurality of particles has an average length of 1000 microns to 5000 microns. In some embodiments, the plurality of particles has an average length of 1200 microns to 5000 microns. In some embodiments, the plurality of particles has an average length of 1400 microns to 5000 microns. In some embodiments, the plurality of particles has an average length of 1600 microns to 5000 microns. In some embodiments, the plurality of particles has an average length of 1800 microns to 5000 microns. In some embodiments, the plurality of particles has an average length of 2000 microns to 5000 microns. In some embodiments, the plurality of particles has an average length of 2200 microns to 5000 microns. In some embodiments, the plurality of particles has an average length of 2400 microns to 5000 microns. In some embodiments, the plurality of particles has an average length of 2600 microns to 5000 microns. In some embodiments, the plurality of particles has an average length of 2800 microns to 5000 microns. In some embodiments, the plurality of particles has an average length of 3000 microns to 5000 microns. In some embodiments, the plurality of particles has an average length of 3200 microns to 5000 microns. In some embodiments, the plurality of particles has an average length of 3400 microns to 5000 microns. In some embodiments, the plurality of particles has an average length of 3600 microns to 5000 microns. In some embodiments, the plurality of particles has an average length of 3800 microns to 5000 microns. In some embodiments, the plurality of particles has an average length of 4000 microns to 5000 microns. In some embodiments, the plurality of particles has an average length of 4200 microns to 5000 microns. In some embodiments, the plurality of particles has an average length of 4400 microns to 5000 microns. In some embodiments, the plurality of particles has an average length of 4600 microns to 5000 microns. In some embodiments, the plurality of particles has an average length of 4800 microns to 5000 microns. In some embodiments, the plurality of particles has an average length of 50 microns to 1000 microns.

In some embodiments, the plurality of particles is different from any component present in the silicone coating. For example, in some embodiments, at least one of at least one silicone fluid, at least one filler, at least one fumed silica, at least one pigment, at least one crosslinker, at least one catalyst, at least one adhesion promoter, or any combination thereof, is different from the plurality of particles.

In some embodiments, the plurality of particles comprises a plurality of mineral particles. In some embodiments, the plurality of particles comprises sand (e.g., sand having an average particle size of 1 micron to 2000 microns, 50 microns to 1000 microns, or any of the other average particle sizes disclosed herein). In some embodiments, the plurality of particles comprises at least one of a polyethylene fiber, a polyester fiber, a glass fiber, a chopped polyethylene fiber, a chopped polyester fiber, a chopped glass fiber, or any combination thereof. In some embodiments, at least one of the foregoing fibers, chopped or not chopped, has an average length of 100 microns to 5000 microns, or any of the other average lengths disclosed herein. In some embodiments, the plurality of particles comprises glass beads. In some embodiments, the plurality of particles comprises glass beads of crushed recycled glass granules. In some embodiments, the plurality of particles comprises plastic granules. In some embodiments, the plurality of particles comprises elastomeric granules or elastomer-containing granules. In some embodiments, the plurality of particles comprises a water-soluble granule (e.g., granules comprising NaCl, NaCl granules, etc.). In some embodiments, the plurality of particles comprises water-soluble polymer powders (e.g., powders comprising cellulose acetate, etc.). In some embodiments, the plurality of particles comprises at least one of nepheline syenite, calcium carbonate, barium sulfate, iron oxide, diatomaceous earth, melamine, quartz, silica, colloidal silica, crystalline silica, precipitated silica, amorphous silica, titanium dioxide, alumina trihydrate, zinc oxide, zirconium oxide, zirconium silicate, zinc borate, chromic oxide, crystalline silica fine powder, amorphous silica fine powder, silicone rubber powder, glass, glass bubbles, glass powder, zeolites, silica hydrogen, silica aero gel, calcium silicate, aluminum silicate, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum, slaked lime, or any combination thereof. In some embodiments, the plurality of particles comprises at least one of a sand, a polymer fiber, a glass fiber, a glass bead, a recycled granule, a polymeric granule, a mineral granule, a water-soluble granule, a polymeric powder, or any combination thereof.

In some embodiments, the roofing membrane comprises a surface layer. In some embodiments, the surface layer is a particle surface layer (e.g., a solids layer or layer of solids, on the surface, etc.) located on at least a portion of a surface of the silicone coating. In some embodiments, the surface layer is not a particle surface layer. In some embodiments, the surface layer is a single layer. In some embodiments, the surface layer is located on at least a portion of a surface of the silicone coating. In some embodiments, the surface layer covers at least a portion of a surface of the silicone coating. In some embodiments, the surface layer directly contacts at least a portion of a surface of the silicone coating. In some embodiments, the surface layer is adhered to at least a portion of a surface of the silicone coating. In some embodiments, the surface layer is embedded into at least a portion of a surface of the silicone coating. In some embodiments, the surface layer is not present when the plurality of particles is present on at least a portion of a surface of the silicone coating. In some embodiments, when the plurality of particles is present on at least a portion of a surface of the silicone coating, the surface layer is located on at least a portion of a surface (e.g., an exposed surface) of the plurality of particles. In some embodiments, the surface is a first surface of the silicone coating. In some embodiments, the surface is a top surface of the silicone coating.

In some embodiments, the surface layer covers at least 50% of a surface of the silicone coating. In some embodiments, the surface layer covers at least 55% of a surface of the silicone coating. In some embodiments, the surface layer covers at least 60% of a surface of the silicone coating. In some embodiments, the surface layer covers at least 65% of a surface of the silicone coating. In some embodiments, the surface layer covers at least 70% of a surface of the silicone coating. In some embodiments, the surface layer covers at least 75% of a surface of the silicone coating. In some embodiments, the surface layer covers at least 80% of a surface of the silicone coating. In some embodiments, the surface layer covers at least 85% of a surface of the silicone coating. In some embodiments, the surface layer covers at least 90% of a surface of the silicone coating. In some embodiments, the surface layer covers at least 95% of a surface of the silicone coating. In some embodiments, the surface layer covers at least 99% of a surface of the silicone coating.

In some embodiments, the surface layer covers 50% to 99% of a surface of the silicone coating. In some embodiments, the surface layer covers 50% to 95% of a surface of the silicone coating. In some embodiments, the surface layer covers 50% to 90% of a surface of the silicone coating. In some embodiments, the surface layer covers 50% to 85% of a surface of the silicone coating. In some embodiments, the surface layer covers 50% to 80% of a surface of the silicone coating. In some embodiments, the surface layer covers 50% to 75% of a surface of the silicone coating. In some embodiments, the surface layer covers 50% to 70% of a surface of the silicone coating. In some embodiments, the surface layer covers 50% to 65% of a surface of the silicone coating. In some embodiments, the surface layer covers 50% to 60% of a surface of the silicone coating. In some embodiments, the surface layer covers 50% to 55% of a surface of the silicone coating.

In some embodiments, the surface layer covers 55% to 99% of a surface of the silicone coating. In some embodiments, the surface layer covers 60% to 99% of a surface of the silicone coating. In some embodiments, the surface layer covers 65% to 99% of a surface of the silicone coating. In some embodiments, the surface layer covers 70% to 99% of a surface of the silicone coating. In some embodiments, the surface layer covers 75% to 99% of a surface of the silicone coating. In some embodiments, the surface layer covers 80% to 99% of a surface of the silicone coating. In some embodiments, the surface layer covers 85% to 99% of a surface of the silicone coating. In some embodiments, the surface layer covers 90% to 99% of a surface of the silicone coating. In some embodiments, the surface layer covers 95% to 99% of a surface of the silicone coating. In some embodiments, the surface layer covers an entire top surface of the silicone coating.

In some embodiments, the surface layer has a thickness of 1 mil to 200 mils. In some embodiments, the surface layer has a thickness of 10 mils to 200 mils. In some embodiments, the surface layer has a thickness of 20 mils to 200 mils. In some embodiments, the surface layer has a thickness of 30 mils to 200 mils. In some embodiments, the surface layer has a thickness of 40 mils to 200 mils. In some embodiments, the surface layer has a thickness of 50 mils to 200 mils. In some embodiments, the surface layer has a thickness of 60 mils to 200 mils. In some embodiments, the surface layer has a thickness of 70 mils to 200 mils. In some embodiments, the surface layer has a thickness of 80 mils to 200 mils. In some embodiments, the surface layer has a thickness of 90 mils to 200 mils. In some embodiments, the surface layer has a thickness of 100 mils to 200 mils. In some embodiments, the surface layer has a thickness of 110 mils to 200 mils. In some embodiments, the surface layer has a thickness of 120 mils to 200 mils. In some embodiments, the surface layer has a thickness of 130 mils to 200 mils. In some embodiments, the surface layer has a thickness of 140 mils to 200 mils. In some embodiments, the surface layer has a thickness of 150 mils to 200 mils. In some embodiments, the surface layer has a thickness of 160 mils to 200 mils. In some embodiments, the surface layer has a thickness of 170 mils to 200 mils. In some embodiments, the surface layer has a thickness of 180 mils to 200 mils. In some embodiments, the surface layer has a thickness of 190 mils to 200 mils.

In some embodiments, the surface layer has a thickness of 1 mil to 190 mils. In some embodiments, the surface layer has a thickness of 1 mil to 180 mils. In some embodiments, the surface layer has a thickness of 1 mil to 170 mils. In some embodiments, the surface layer has a thickness of 1 mil to 160 mils. In some embodiments, the surface layer has a thickness of 1 mil to 150 mils. In some embodiments, the surface layer has a thickness of 1 mil to 140 mils. In some embodiments, the surface layer has a thickness of 1 mil to 130 mils. In some embodiments, the surface layer has a thickness of 1 mil to 120 mils. In some embodiments, the surface layer has a thickness of 1 mil to 110 mils. In some embodiments, the surface layer has a thickness of 1 mil to 100 mils. In some embodiments, the surface layer has a thickness of 1 mil to 90 mils. In some embodiments, the surface layer has a thickness of 1 mil to 80 mils. In some embodiments, the surface layer has a thickness of 1 mil to 70 mils. In some embodiments, the surface layer has a thickness of 1 mil to 60 mils. In some embodiments, the surface layer has a thickness of 1 mil to 50 mils. In some embodiments, the surface layer has a thickness of 1 mil to 40 mils. In some embodiments, the surface layer has a thickness of 1 mil to 30 mils. In some embodiments, the surface layer has a thickness of 1 mil to 20 mils. In some embodiments, the surface layer has a thickness of 1 mil to 10 mils.

In some embodiments, the surface layer comprises at least one silane compound. In some embodiments, the surface layer comprises at least one of aminopropylsilane, glycidyloxypropylsilane, perfluoroalkylsilane, any derivative thereof, any reaction product thereof, or any combination thereof.

In some embodiments, when the roofing membrane is installed on a roofing substrate, at least a portion of a surface of the plurality of particles is exposed to an environment. In some embodiments, at least a portion of the plurality of particles is directly exposed to an environment. In some embodiments, a surface is not exposed to an environment when the surface is not directly exposed to the environment. In some embodiments, when the roofing membrane is installed on a roofing substrate, 1% to 99% of the surface of the plurality of particles is exposed to the environment. In some embodiments, when the roofing membrane is installed on a roofing substrate, 1% to 95% of the surface of the plurality of particles is exposed to the environment. In some embodiments, when the roofing membrane is installed on a roofing substrate, 1% to 90% of the surface of the plurality of particles is exposed to the environment. In some embodiments, when the roofing membrane is installed on a roofing substrate, 1% to 85% of the surface of the plurality of particles is exposed to the environment. In some embodiments, when the roofing membrane is installed on a roofing substrate, 1% to 80% of the surface of the plurality of particles is exposed to the environment. In some embodiments, when the roofing membrane is installed on a roofing substrate, 1% to 75% of the surface of the plurality of particles is exposed to the environment. In some embodiments, when the roofing membrane is installed on a roofing substrate, 1% to 70% of the surface of the plurality of particles is exposed to the environment. In some embodiments, when the roofing membrane is installed on a roofing substrate, 1% to 65% of the surface of the plurality of particles is exposed to the environment. In some embodiments, when the roofing membrane is installed on a roofing substrate, 1% to 60% of the surface of the plurality of particles is exposed to the environment. In some embodiments, when the roofing membrane is installed on a roofing substrate, 1% to 55% of the surface of the plurality of particles is exposed to the environment. In some embodiments, when the roofing membrane is installed on a roofing substrate, 1% to 50% of the surface of the plurality of particles is exposed to the environment. In some embodiments, when the roofing membrane is installed on a roofing substrate, 1% to 45% of the surface of the plurality of particles is exposed to the environment. In some embodiments, when the roofing membrane is installed on a roofing substrate, 1% to 40% of the surface of the plurality of particles is exposed to the environment. In some embodiments, when the roofing membrane is installed on a roofing substrate, 1% to 35% of the surface of the plurality of particles is exposed to the environment. In some embodiments, when the roofing membrane is installed on a roofing substrate, 1% to 30% of the surface of the plurality of particles is exposed to the environment. In some embodiments, when the roofing membrane is installed on a roofing substrate, 1% to 25% of the surface of the plurality of particles is exposed to the environment. In some embodiments, when the roofing membrane is installed on a roofing substrate, 1% to 20% of the surface of the plurality of particles is exposed to the environment. In some embodiments, when the roofing membrane is installed on a roofing substrate, 1% to 15% of the surface of the plurality of particles is exposed to the environment. In some embodiments, when the roofing membrane is installed on a roofing substrate, 1% to 10% of the surface of the plurality of particles is exposed to the environment. In some embodiments, when the roofing membrane is installed on a roofing substrate, 1% to 5% of the surface of the plurality of particles is exposed to the environment.

In some embodiments, when the roofing membrane is installed on a roofing substrate, 5% to 99% of the surface of the plurality of particles is exposed to the environment. In some embodiments, when the roofing membrane is installed on a roofing substrate, 10% to 99% of the surface of the plurality of particles is exposed to the environment. In some embodiments, when the roofing membrane is installed on a roofing substrate, 15% to 99% of the surface of the plurality of particles is exposed to the environment. In some embodiments, when the roofing membrane is installed on a roofing substrate, 20% to 99% of the surface of the plurality of particles is exposed to the environment. In some embodiments, when the roofing membrane is installed on a roofing substrate, 25% to 99% of the surface of the plurality of particles is exposed to the environment. In some embodiments, when the roofing membrane is installed on a roofing substrate, 30% to 99% of the surface of the plurality of particles is exposed to the environment. In some embodiments, when the roofing membrane is installed on a roofing substrate, 35% to 99% of the surface of the plurality of particles is exposed to the environment. In some embodiments, when the roofing membrane is installed on a roofing substrate, 40% to 99% of the surface of the plurality of particles is exposed to the environment. In some embodiments, when the roofing membrane is installed on a roofing substrate, 45% to 99% of the surface of the plurality of particles is exposed to the environment. In some embodiments, when the roofing membrane is installed on a roofing substrate, 50% to 99% of the surface of the plurality of particles is exposed to the environment. In some embodiments, when the roofing membrane is installed on a roofing substrate, 55% to 99% of the surface of the plurality of particles is exposed to the environment. In some embodiments, when the roofing membrane is installed on a roofing substrate, 60% to 99% of the surface of the plurality of particles is exposed to the environment. In some embodiments, when the roofing membrane is installed on a roofing substrate, 65% to 99% of the surface of the plurality of particles is exposed to the environment. In some embodiments, when the roofing membrane is installed on a roofing substrate, 70% to 99% of the surface of the plurality of particles is exposed to the environment. In some embodiments, when the roofing membrane is installed on a roofing substrate, 75% to 99% of the surface of the plurality of particles is exposed to the environment. In some embodiments, when the roofing membrane is installed on a roofing substrate, 80% to 99% of the surface of the plurality of particles is exposed to the environment. In some embodiments, when the roofing membrane is installed on a roofing substrate, 85% to 99% of the surface of the plurality of particles is exposed to the environment. In some embodiments, when the roofing membrane is installed on a roofing substrate, 90% to 99% of the surface of the plurality of particles is exposed to the environment. In some embodiments, when the roofing membrane is installed on a roofing substrate, 95% to 99% of the surface of the plurality of particles is exposed to the environment.

In some embodiments, when the roofing membrane is installed on a roofing substrate, at least a portion of the surface of the silicone coating is exposed to the environment. In some embodiments, when the roofing membrane is installed on a roofing substrate, 1% to 99% of the surface of the silicone coating is exposed to the environment. In some embodiments, when the roofing membrane is installed on a roofing substrate, 1% to 95% of the surface of the silicone coating is exposed to the environment. In some embodiments, when the roofing membrane is installed on a roofing substrate, 1% to 90% of the surface of the silicone coating is exposed to the environment. In some embodiments, when the roofing membrane is installed on a roofing substrate, 1% to 85% of the surface of the silicone coating is exposed to the environment. In some embodiments, when the roofing membrane is installed on a roofing substrate, 1% to 80% of the surface of the silicone coating is exposed to the environment. In some embodiments, when the roofing membrane is installed on a roofing substrate, 1% to 75% of the surface of the silicone coating is exposed to the environment. In some embodiments, when the roofing membrane is installed on a roofing substrate, 1% to 70% of the surface of the silicone coating is exposed to the environment. In some embodiments, when the roofing membrane is installed on a roofing substrate, 1% to 65% of the surface of the silicone coating is exposed to the environment. In some embodiments, when the roofing membrane is installed on a roofing substrate, 1% to 60% of the surface of the silicone coating is exposed to the environment. In some embodiments, when the roofing membrane is installed on a roofing substrate, 1% to 55% of the surface of the silicone coating is exposed to the environment. In some embodiments, when the roofing membrane is installed on a roofing substrate, 1% to 50% of the surface of the silicone coating is exposed to the environment. In some embodiments, when the roofing membrane is installed on a roofing substrate, 1% to 45% of the surface of the silicone coating is exposed to the environment. In some embodiments, when the roofing membrane is installed on a roofing substrate, 1% to 40% of the surface of the silicone coating is exposed to the environment. In some embodiments, when the roofing membrane is installed on a roofing substrate, 1% to 35% of the surface of the silicone coating is exposed to the environment. In some embodiments, when the roofing membrane is installed on a roofing substrate, 1% to 30% of the surface of the silicone coating is exposed to the environment. In some embodiments, when the roofing membrane is installed on a roofing substrate, 1% to 25% of the surface of the silicone coating is exposed to the environment. In some embodiments, when the roofing membrane is installed on a roofing substrate, 1% to 20% of the surface of the silicone coating is exposed to the environment. In some embodiments, when the roofing membrane is installed on a roofing substrate, 1% to 15% of the surface of the silicone coating is exposed to the environment. In some embodiments, when the roofing membrane is installed on a roofing substrate, 1% to 10% of the surface of the silicone coating is exposed to the environment. In some embodiments, when the roofing membrane is installed on a roofing substrate, 1% to 5% of the surface of the silicone coating is exposed to the environment.

In some embodiments, when the roofing membrane is installed on a roofing substrate, 5% to 99% of the surface of the silicone coating is exposed to the environment. In some embodiments, when the roofing membrane is installed on a roofing substrate, 10% to 99% of the surface of the silicone coating is exposed to the environment. In some embodiments, when the roofing membrane is installed on a roofing substrate, 15% to 99% of the surface of the silicone coating is exposed to the environment. In some embodiments, when the roofing membrane is installed on a roofing substrate, 20% to 99% of the surface of the silicone coating is exposed to the environment. In some embodiments, when the roofing membrane is installed on a roofing substrate, 25% to 99% of the surface of the silicone coating is exposed to the environment. In some embodiments, when the roofing membrane is installed on a roofing substrate, 30% to 99% of the surface of the silicone coating is exposed to the environment. In some embodiments, when the roofing membrane is installed on a roofing substrate, 35% to 99% of the surface of the silicone coating is exposed to the environment. In some embodiments, when the roofing membrane is installed on a roofing substrate, 40% to 99% of the surface of the silicone coating is exposed to the environment. In some embodiments, when the roofing membrane is installed on a roofing substrate, 45% to 99% of the surface of the silicone coating is exposed to the environment. In some embodiments, when the roofing membrane is installed on a roofing substrate, 50% to 99% of the surface of the silicone coating is exposed to the environment. In some embodiments, when the roofing membrane is installed on a roofing substrate, 55% to 99% of the surface of the silicone coating is exposed to the environment. In some embodiments, when the roofing membrane is installed on a roofing substrate, 60% to 99% of the surface of the silicone coating is exposed to the environment. In some embodiments, when the roofing membrane is installed on a roofing substrate, 65% to 99% of the surface of the silicone coating is exposed to the environment. In some embodiments, when the roofing membrane is installed on a roofing substrate, 70% to 99% of the surface of the silicone coating is exposed to the environment. In some embodiments, when the roofing membrane is installed on a roofing substrate, 75% to 99% of the surface of the silicone coating is exposed to the environment. In some embodiments, when the roofing membrane is installed on a roofing substrate, 80% to 99% of the surface of the silicone coating is exposed to the environment. In some embodiments, when the roofing membrane is installed on a roofing substrate, 85% to 99% of the surface of the silicone coating is exposed to the environment. In some embodiments, when the roofing membrane is installed on a roofing substrate, 90% to 99% of the surface of the silicone coating is exposed to the environment. In some embodiments, when the roofing membrane is installed on a roofing substrate, 95% to 99% of the surface of the silicone coating is exposed to the environment. In some embodiments, the surface is the first surface of the silicone coating. In some embodiments, the surface is the top surface of the silicone coating.

In some embodiments, the roofing membrane comprises an adhesive layer. In some embodiments, the adhesive layer is located on the second surface of the substrate. In some embodiments, the adhesive layer covers at least a portion of the second surface of the substrate. In some embodiments, the adhesive layer directly contacts at least a portion of the second surface of the substrate. In some embodiments, the adhesive layer is pressed into at least a portion of the second surface of the substrate. In some embodiments, the adhesive layer is embedded into at least a portion of the second surface of the substrate. In some embodiments, an intervening layer is located between the adhesive layer and the second surface of the substrate. In some embodiments, the second surface is the bottom surface of the substrate.

In some embodiments, the adhesive layer covers 1% to 99% of a surface of the substrate. In some embodiments, the adhesive layer covers 1% to 95% of a surface of the substrate. In some embodiments, the adhesive layer covers 1% to 90% of a surface of the substrate. In some embodiments, the adhesive layer covers 1% to 85% of a surface of the substrate. In some embodiments, the adhesive layer covers 1% to 80% of a surface of the substrate. In some embodiments, the adhesive layer covers 1% to 75% of a surface of the substrate. In some embodiments, the adhesive layer covers 1% to 70% of a surface of the substrate. In some embodiments, the adhesive layer covers 1% to 65% of a surface of the substrate. In some embodiments, the adhesive layer covers 1% to 60% of a surface of the substrate. In some embodiments, the adhesive layer covers 1% to 55% of a surface of the substrate. In some embodiments, the adhesive layer covers 1% to 50% of a surface of the substrate. In some embodiments, the adhesive layer covers 1% to 45% of a surface of the substrate. In some embodiments, the adhesive layer covers 1% to 40% of a surface of the substrate. In some embodiments, the adhesive layer covers 1% to 35% of a surface of the substrate. In some embodiments, the adhesive layer covers 1% to 30% of a surface of the substrate. In some embodiments, the adhesive layer covers 1% to 25% of a surface of the substrate. In some embodiments, the adhesive layer covers 1% to 20% of a surface of the substrate. In some embodiments, the adhesive layer covers 1% to 15% of a surface of the substrate. In some embodiments, the adhesive layer covers 1% to 10% of a surface of the substrate. In some embodiments, the adhesive layer covers 1% to 5% of a surface of the substrate.

In some embodiments, the adhesive layer covers 5% to 99% of a surface of the substrate. In some embodiments, the adhesive layer covers 10% to 99% of a surface of the substrate. In some embodiments, the adhesive layer covers 15% to 99% of a surface of the substrate. In some embodiments, the adhesive layer covers 20% to 99% of a surface of the substrate. In some embodiments, the adhesive layer covers 25% to 99% of a surface of the substrate. In some embodiments, the adhesive layer covers 30% to 99% of a surface of the substrate. In some embodiments, the adhesive layer covers 35% to 99% of a surface of the substrate. In some embodiments, the adhesive layer covers 40% to 99% of a surface of the substrate. In some embodiments, the adhesive layer covers 45% to 99% of a surface of the substrate. In some embodiments, the adhesive layer covers 50% to 99% of a surface of the substrate. In some embodiments, the adhesive layer covers 55% to 99% of a surface of the substrate. In some embodiments, the adhesive layer covers 60% to 99% of a surface of the substrate. In some embodiments, the adhesive layer covers 65% to 99% of a surface of the substrate. In some embodiments, the adhesive layer covers 70% to 99% of a surface of the substrate. In some embodiments, the adhesive layer covers 75% to 99% of a surface of the substrate. In some embodiments, the adhesive layer covers 80% to 99% of a surface of the substrate. In some embodiments, the adhesive layer covers 85% to 99% of a surface of the substrate. In some embodiments, the adhesive layer covers 90% to 99% of a surface of the substrate. In some embodiments, the adhesive layer covers 95% to 99% of a surface of the substrate. In some embodiments, the adhesive layer covers an entire surface of the substrate.

In some embodiments, the adhesive layer has a thickness of 1 mil to 200 mils. In some embodiments, the adhesive layer has a thickness of 10 mils to 200 mils. In some embodiments, the adhesive layer has a thickness of 20 mils to 200 mils. In some embodiments, the adhesive layer has a thickness of 30 mils to 200 mils. In some embodiments, the adhesive layer has a thickness of 40 mils to 200 mils. In some embodiments, the adhesive layer has a thickness of 50 mils to 200 mils. In some embodiments, the adhesive layer has a thickness of 60 mils to 200 mils. In some embodiments, the adhesive layer has a thickness of 70 mils to 200 mils. In some embodiments, the adhesive layer has a thickness of 80 mils to 200 mils. In some embodiments, the adhesive layer has a thickness of 90 mils to 200 mils. In some embodiments, the adhesive layer has a thickness of 100 mils to 200 mils. In some embodiments, the adhesive layer has a thickness of 110 mils to 200 mils. In some embodiments, the adhesive layer has a thickness of 120 mils to 200 mils. In some embodiments, the adhesive layer has a thickness of 130 mils to 200 mils. In some embodiments, the adhesive layer has a thickness of 140 mils to 200 mils. In some embodiments, the adhesive layer has a thickness of 150 mils to 200 mils. In some embodiments, the adhesive layer has a thickness of 160 mils to 200 mils. In some embodiments, the adhesive layer has a thickness of 170 mils to 200 mils. In some embodiments, the adhesive layer has a thickness of 180 mils to 200 mils. In some embodiments, the adhesive layer has a thickness of 190 mils to 200 mils.

In some embodiments, the adhesive layer has a thickness of 1 mil to 190 mils. In some embodiments, the adhesive layer has a thickness of 1 mil to 180 mils. In some embodiments, the adhesive layer has a thickness of 1 mil to 170 mils. In some embodiments, the adhesive layer has a thickness of 1 mil to 160 mils. In some embodiments, the adhesive layer has a thickness of 1 mil to 150 mils. In some embodiments, the adhesive layer has a thickness of 1 mil to 140 mils. In some embodiments, the adhesive layer has a thickness of 1 mil to 130 mils. In some embodiments, the adhesive layer has a thickness of 1 mil to 120 mils. In some embodiments, the adhesive layer has a thickness of 1 mil to 110 mils. In some embodiments, the adhesive layer has a thickness of 1 mil to 100 mils. In some embodiments, the adhesive layer has a thickness of 1 mil to 90 mils. In some embodiments, the adhesive layer has a thickness of 1 mil to 80 mils. In some embodiments, the adhesive layer has a thickness of 1 mil to 70 mils. In some embodiments, the adhesive layer has a thickness of 1 mil to 60 mils. In some embodiments, the adhesive layer has a thickness of 1 mil to 50 mils. In some embodiments, the adhesive layer has a thickness of 1 mil to 40 mils. In some embodiments, the adhesive layer has a thickness of 1 mil to 30 mils. In some embodiments, the adhesive layer has a thickness of 1 mil to 20 mils. In some embodiments, the adhesive layer has a thickness of 1 mil to 10 mils.

In some embodiments, the adhesive layer comprises at least one adhesive. In some embodiments, the at least one adhesive comprises at least one of a hot melt adhesive, a solvent-based adhesive, a pressure sensitive adhesive, a water-based adhesive, a UV cured or UV curable polymer, or any combination thereof. In some embodiments, the at least one adhesive comprises at least one of an asphaltic adhesive, a butyl adhesive, a silicone adhesive, an acrylic adhesive, a synthetic thermoplastic elastomer, a natural rubber, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof. In some embodiments, the at least one adhesive comprises at one elastomer. In some embodiments, the at least one elastomer comprises at least one of a butyl rubber, a styrenic block copolymer, or any combination thereof.

In some embodiments, the at least one adhesive comprises at least one of an asphaltic adhesive, a butyl adhesive, a silicone adhesive, an epoxy adhesive, a polyurethane adhesive, an acrylic adhesive, or any combination thereof. In some embodiments, the at least one adhesive comprises at least one of thermosetting polyolefin, thermoplastic polyolefin (TPO), polyvinyl butyrate, silicone, polycarbonate, butyl rubber, styrene, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymer, an acrylic copolymer, (e.g., at least one of vinyl acetate acrylic, ethylene vinyl acetate, an ethylene acrylic, styrene acrylic, vinyl chloride acrylic, vinyl versatate, or any combination thereof), a silyl modified polymer, a silane terminated polymer, natural rubber, a polyolefin polymer, a poly-alpha-olefin (APAO/APO) polymer, a polyamide polyvinyl acetate, a polyvinyl alcohol, a polyamide, a polyester, a polyester amide, or any combination thereof.

In some embodiments, the roofing membrane comprises a release liner. In some embodiments, the release liner covers at least a portion of the adhesive layer. In some embodiments, the release liner covers an entire surface of the adhesive layer.

FIG. 1 is a schematic diagram of a cross-section of a roofing membrane 100, according to some embodiments. As shown in FIG. 1, in some embodiments, the roofing membrane 100 comprises a plurality of particles 102. In some embodiments, the roofing membrane comprises a silicone coating 104. In some embodiments, the roofing membrane comprises a substrate 106. In some embodiments, the roofing membrane comprises an adhesive layer 108. In some embodiments, the roofing membrane comprises a release liner 110. In some embodiments, the substrate 106 is located between the silicone coating 104 and the adhesive layer 108. In some embodiments, the adhesive layer 108 is located between the substrate 106 and the release liner 110. In some embodiments, the release liner 110 covers at least a portion of the adhesive layer 108. In some embodiments, the plurality of particles 102 covers at least a portion of a surface of the silicone coating 104. In some embodiments, each of the plurality of particles 102 has a surface. In some embodiments, when the roofing membrane 100 is installed on a roofing substrate, at least a portion of the surface of the plurality of particles 102 is exposed to an environment.

Figure 2:
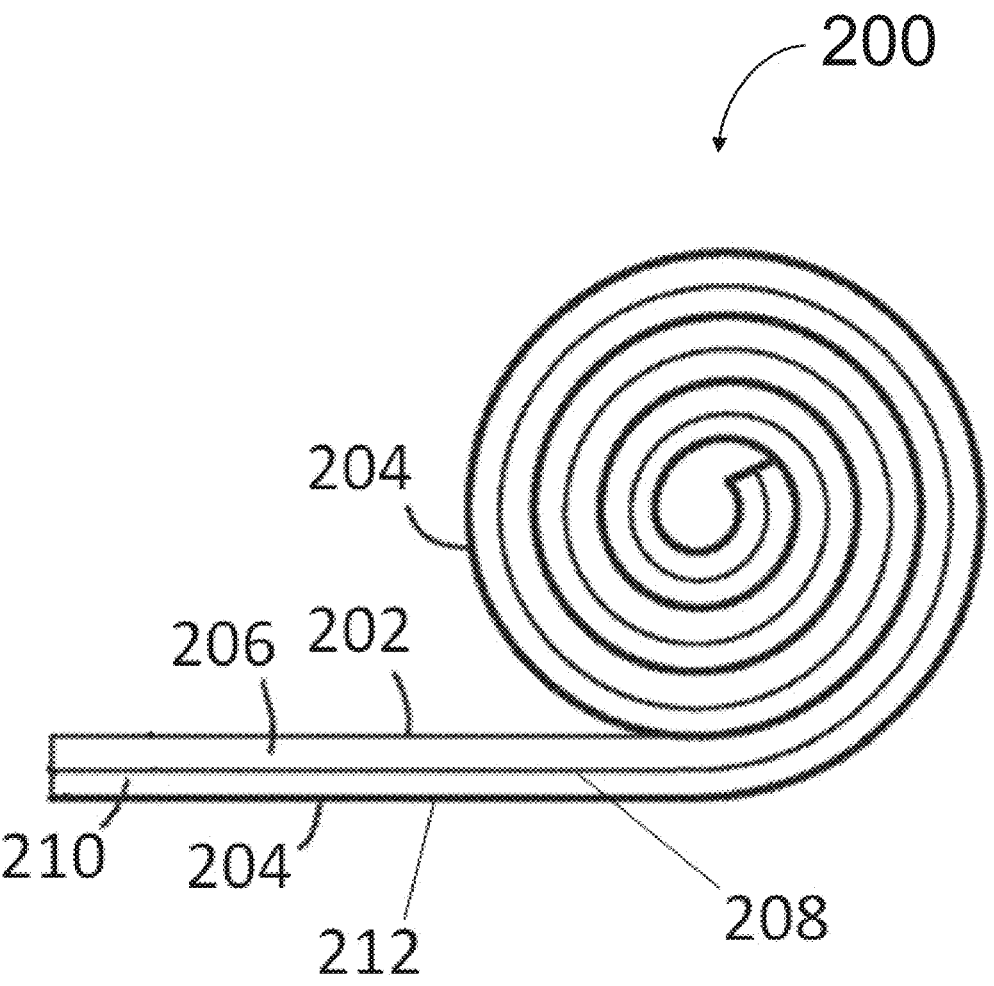
FIG. 2 is a schematic diagram of a cross-section of a roll of a roofing membrane, according to some embodiments.

FIG. 2 is a schematic diagram of a cross-section of a roll of a roofing membrane 200, according to some embodiments. As shown in FIG. 2, in some embodiments, the roofing membrane 200 has a first surface 202 and a second surface 204 opposite the first surface 202. In some embodiments, at least a portion of the second surface 204 of the roofing membrane 200 contacts at least a portion of the first surface 202 of the roofing membrane 200. In some embodiments, the roofing membrane 202 comprises a plurality of particles (not shown). In some embodiments, the roofing membrane 200 comprises a silicone coating 206. In some embodiments, the roofing membrane 200 comprises a substrate 208. In some embodiments, the roofing membrane 200 comprises an adhesive layer 210. In some embodiments, the roofing membrane 200 comprises a release liner 212. In some embodiments, the substrate 208 is located between the silicone coating 206 and the adhesive layer 210. In some embodiments, the adhesive layer 210 is located between the substrate 208 and the release liner 212. In some embodiments, the release liner 212 covers at least a portion of the adhesive layer 210. In some embodiments, the plurality of particles (not shown) covers at least a portion of a surface of the silicone coating 206. In some embodiments, each of the plurality of particles has a surface. In some embodiments, when the roofing membrane 200 is installed on a roofing substrate (not shown), at least a portion of the surface of the plurality of particles is exposed to an environment.

Figure 3:
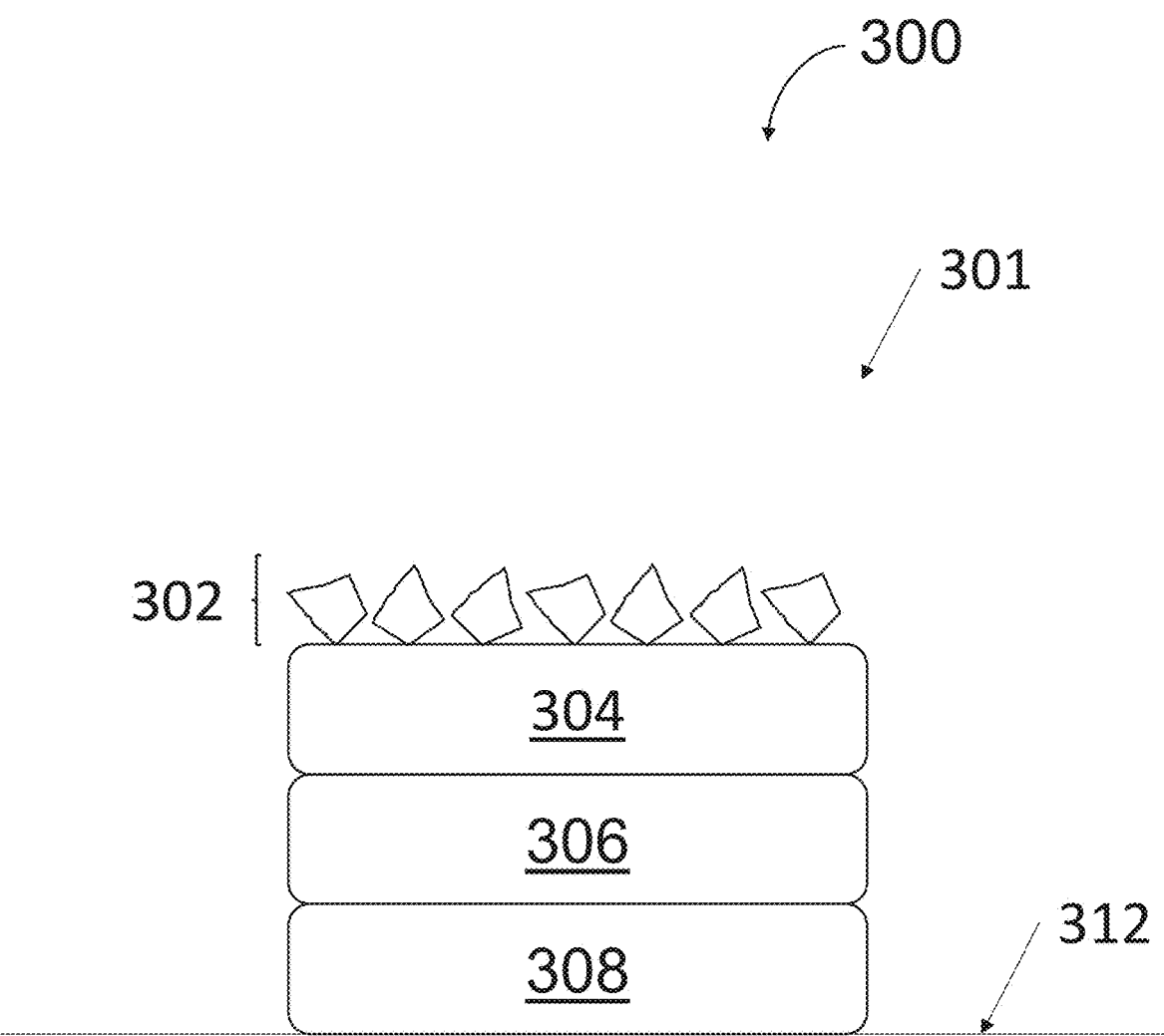
FIG. 3 is a schematic diagram of a cross-section of a roofing system, according to some embodiments.

FIG. 3 is a schematic diagram of a cross-section of a roofing system 300, according to some embodiments. As shown in FIG. 3, in some embodiments, the roofing system 300 comprises a roofing substrate 312. In some embodiments, the roofing substrate 301 comprises at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a polyisocyanurate (ISO) foam board, a cover board, a pipe, a base sheet, a chimney, a wax paper, or any combination thereof.

In some embodiments, the roofing membrane 301 is located on the roofing substrate 312. In some embodiments, the roofing membrane 301 is installed on the roofing substrate 312. In some embodiments, the roofing membrane 301 directly contacts the roofing substrate 312. In some embodiments, the roofing membrane 301 is adhered to the roofing substrate 312 by an adhesive layer 308 (e.g., an adhesive layer 308 of the roofing membrane). In some embodiments, the roofing membrane 301 is secured to the roofing substrate 312 by a mechanical fastener (e.g., a nail, a screw, etc.). In some embodiments, an intervening layer is located between the roofing membrane 301 and the roofing substrate 312. In some embodiments, the adhesive layer 308 of the roofing membrane 301 is located between the roofing substrate 312 and the substrate 306 of the roofing membrane 301. In some embodiments, the adhesive layer 308 of the roofing membrane 301 adheres the roofing membrane 301 to the roofing substrate 312.

In some embodiments, the roofing membrane comprises any of the roofing membranes disclosed herein. For example, in some embodiments, the roofing membrane 301 comprises a plurality of particles 302. In some embodiments, the roofing membrane 301 comprises a silicone coating 304. In some embodiments, the roofing membrane 301 comprises a substrate 306. In some embodiments, the roofing membrane 301 comprises an adhesive layer 308. In some embodiments, the substrate 306 is located between the silicone coating 304 and the adhesive layer 308. In some embodiments, the adhesive layer 308 is located between the substrate 306 and the roofing substrate 312. In some embodiments, the adhesive layer 308 adheres the roofing membrane 301 to the roofing substrate 312. In some embodiments, the plurality of particles 302 covers at least a portion of a surface of the silicone coating 304. In some embodiments, each of the plurality of particles 302 has a surface. In some embodiments, at least a portion of the surface of the plurality of particles 302 is exposed to an environment.

Figure 4:
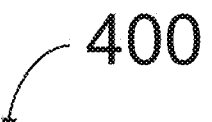
FIG. 4 is a flowchart of a method of installing a roofing membrane, according to some embodiments.
Figure 4:
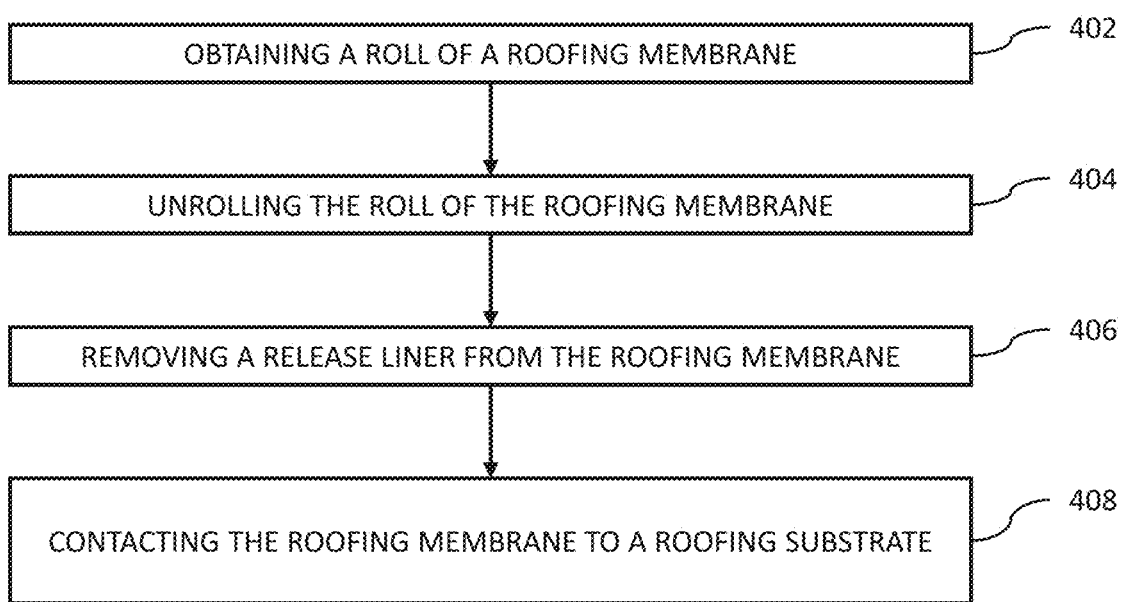

FIG. 4 is a flowchart of a method of installing a roofing membrane, according to some embodiments. As shown in FIG. 4, in some embodiments, the method of installing the roofing membrane comprises one or more of the following steps: obtaining 402 a roll of a roofing membrane; unrolling 404 the roll of the roofing membrane; removing 406 the release liner from the roofing membrane so as to expose the adhesive layer; contacting 408 the adhesive layer of the roofing membrane to the roofing substrate so as to adhere the roofing membrane to the roofing substrate.

In some embodiments, the method of installing comprises obtaining 402 a roofing membrane. In some embodiments, the method of installing comprises obtaining 402 a roll of a roofing membrane. Any of the roofing membranes disclosed herein may be employed without departing from the scope of this disclosure. For example, in some embodiments, the roofing membrane has a first surface and a second surface opposite the first surface. In some embodiments, at least a portion of the second surface of the roofing membrane contacts at least a portion of the first surface of the roofing membrane. In some embodiments, the roofing membrane comprises a plurality of particles. In some embodiments, the roofing membrane comprises a silicone coating. In some embodiments, the roofing membrane comprises a substrate. In some embodiments, the roofing membrane comprises an adhesive layer. In some embodiments, the roofing membrane comprises a release liner. In some embodiments, the substrate is located between the silicone coating and the adhesive layer. In some embodiments, the adhesive layer is located between the substrate and the release liner. In some embodiments, the release liner covers at least a portion of the adhesive layer. In some embodiments, the plurality of particles covers at least a portion of a surface of the silicone coating. In some embodiments, each of the plurality of particles has a surface. In some embodiments, when the roofing membrane is installed on a roofing substrate, at least a portion of the surface of the plurality of particles is exposed to an environment.

In some embodiments, the method of installing the roofing membrane comprises unrolling 404 the roll of the roofing membrane. In some embodiments, the unrolling 404 comprises laying the roofing membrane flat (e.g., at least partially unrolled). In some embodiments, the unrolling 404 comprises laying a portion of the roofing membrane flat. In some embodiments, the unrolling 404 comprises placing the roofing membrane or the roll of the roofing membrane at or proximal to a location on the roofing substrate where the roofing membrane is to be installed. In some embodiments, the unrolling 404 comprises placing the roofing membrane or the roll of the roofing membrane over a location on the roofing substrate wherein the roofing membrane is to be installed. In some embodiments, the unrolling 404 comprises pushing an end of the roll of the roofing membrane such that at least a portion of the roofing membrane is laid flat. In some embodiments, the unrolling 404 comprises pulling an end of the roll of the roofing membrane such that at least a portion of the roofing membrane is laid flat.

In some embodiments, the method of installing the roofing membrane comprises removing 406 the release liner from the roofing membrane so as to expose the adhesive layer. In some embodiments, the removing 406 comprises peeling at least a portion of the release liner away from the roofing membrane so as to expose the adhesive layer. In some embodiments, the removing 406 comprises pulling at least a portion of the release liner away from the roofing membrane so as to expose the adhesive layer. In some embodiments, the removing 406 comprises disengaging at least a portion of the release liner away from the roofing membrane so as to expose the adhesive layer. In some embodiments, the removing 406 comprises separating at least a portion of the release liner away from the roofing membrane so as to expose the adhesive layer. In some embodiments, the removing 406 comprises delaminating at least a portion of the release liner away from the roofing membrane so as to expose the adhesive layer.

In some embodiments, the method of installing the roofing membrane comprises contacting 408 the adhesive layer of the roofing membrane to a roofing substrate so as to adhere the roofing membrane to the roofing substrate. In some embodiments, the contacting 408 comprises bringing the adhesive layer of the roofing membrane into immediate or close proximity to the roofing substrate. In some embodiments, the contacting 408 comprises directly contacting the adhesive layer of the roofing membrane to a roofing substrate. In some embodiments, the contacting 408 comprises adhering the adhesive layer of the roofing membrane to a roofing substrate. In some embodiments, the contacting 408 comprises pressing the adhesive layer of the roofing membrane onto a roofing substrate. In some embodiments, the contacting 408 comprises heating the adhesive layer of the roofing membrane sufficient to adhere the adhesive layer of the roofing membrane to a roofing substrate.

FIG. 5 is a flowchart of a method of manufacturing a roofing membrane, according to some embodiments. As shown in FIG. 5, in some embodiments, the method of manufacturing a roofing membrane comprises one or more of the following steps: obtaining 502 at least one of a substrate, a silicone formulation, a plurality of particles, a surface layer composition, or any combination thereof; applying 504 the silicone formulation to at least a portion of a surface of the substrate so as to form an uncured silicone coating; curing 506 the uncured silicone coating so as to form a partially cured silicone coating; applying 508 the plurality of particles to at least a portion of a surface of the partially cured silicone coating; applying 510 the surface layer composition to at least a portion of a surface of the partially cured silicone coating and/or at least a portion of a surface of the plurality of particles; and curing 512 the partially cured silicone coating to obtain a cured silicone coating.

In some embodiments, the method of manufacturing a roofing membrane comprises obtaining 502 at least one of a substrate, a silicone formulation, a plurality of particles, a surface layer composition, or any combination thereof. In some embodiments, the substrate comprises any one or more of the substrates disclosed herein. In some embodiments, the silicone formulation comprises any one or more of the components or precursors of the silicone coating. In some embodiments, the plurality of particles comprises any one or more of the plurality of particles disclosed herein. In some embodiments, the surface layer composition comprises any one or more of the components or precursors of the surface layers disclosed herein. In some embodiments, a precursor refers to an unreacted component.

In some embodiments, the method of manufacturing 500 a roofing membrane comprises applying 504 the silicone composition to at least a portion of a surface of the substrate so as to form an uncured silicone coating. In some embodiments, applying 504 comprises coating the silicone composition onto at least a portion of a surface of the substrate. In some embodiments, applying 504 comprises laminating the silicone composition onto at least a portion of a surface of the substrate. In some embodiments, applying 504 comprises casting the silicone composition onto at least a portion of a surface of the substrate. In some embodiments, applying 504 comprises extruding the silicone composition onto at least a portion of a surface of the substrate. In some embodiments, applying 504 comprises bonding the silicone composition to the first surface of the reinforcement layer. In some embodiments, applying 504 comprises pouring the silicone composition onto at least a portion of a surface of the substrate. In some embodiments, applying 504 comprises disposing the silicone composition onto at least a portion of a surface of the substrate. In some embodiments, applying 504 comprises contacting the silicone composition with at least a portion of a surface of the substrate. In some embodiments, applying 504 comprises spraying the silicone composition onto at least a portion of a surface of the substrate.

In some embodiments, the uncured silicone coating has a wet film thickness of 1 mil to 499 mils. In some embodiments, the uncured silicone coating has a wet film thickness of 10 mils to 499 mils. In some embodiments, the uncured silicone coating has a wet film thickness of 20 mils to 499 mils. In some embodiments, the uncured silicone coating has a wet film thickness of 40 mils to 499 mils. In some embodiments, the uncured silicone coating has a wet film thickness of 60 mils to 499 mils. In some embodiments, the uncured silicone coating has a wet film thickness of 80 mils to 499 mils. In some embodiments, the uncured silicone coating has a wet film thickness of 100 mils to 499 mils. In some embodiments, the uncured silicone coating has a wet film thickness of 110 mils to 499 mils. In some embodiments, the uncured silicone coating has a wet film thickness of 120 mils to 499 mils. In some embodiments, the uncured silicone coating has a wet film thickness of 140 mils to 499 mils. In some embodiments, the uncured silicone coating has a wet film thickness of 160 mils to 499 mils. In some embodiments, the uncured silicone coating has a wet film thickness of 180 mils to 499 mils. In some embodiments, the uncured silicone coating has a wet film thickness of 200 mils to 499 mils.

In some embodiments, the uncured silicone coating has a wet film thickness of 220 mils to 499 mils. In some embodiments, the uncured silicone coating has a wet film thickness of 240 mils to 499 mils. In some embodiments, the uncured silicone coating has a wet film thickness of 260 mils to 499 mils. In some embodiments, the uncured silicone coating has a wet film thickness of 280 mils to 499 mils. In some embodiments, the uncured silicone coating has a wet film thickness of 300 mils to 499 mils. In some embodiments, the uncured silicone coating has a wet film thickness of 320 mils to 499 mils. In some embodiments, the uncured silicone coating has a wet film thickness of 340 mils to 499 mils. In some embodiments, the uncured silicone coating has a wet film thickness of 360 mils to 499 mils. In some embodiments, the uncured silicone coating has a wet film thickness of 380 mils to 499 mils. In some embodiments, the uncured silicone coating has a wet film thickness of 400 mils to 499 mils. In some embodiments, the uncured silicone coating has a wet film thickness of 420 mils to 499 mils. In some embodiments, the uncured silicone coating has a wet film thickness of 440 mils to 499 mils. In some embodiments, the uncured silicone coating has a wet film thickness of 460 mils to 499 mils. In some embodiments, the uncured silicone coating has a wet film thickness of 480 mils to 499 mils.

In some embodiments, the uncured silicone coating has a wet film thickness of 1 mil to 480 mils. In some embodiments, the uncured silicone coating has a wet film thickness of 1 mil to 460 mils. In some embodiments, the uncured silicone coating has a wet film thickness of 1 mil to 440 mils. In some embodiments, the uncured silicone coating has a wet film thickness of 1 mil to 420 mils. In some embodiments, the uncured silicone coating has a wet film thickness of 1 mil to 400 mils. In some embodiments, the uncured silicone coating has a wet film thickness of 1 mil to 380 mils. In some embodiments, the uncured silicone coating has a wet film thickness of 1 mil to 360 mils. In some embodiments, the uncured silicone coating has a wet film thickness of 1 mil to 340 mils. In some embodiments, the uncured silicone coating has a wet film thickness of 1 mil to 320 mils. In some embodiments, the uncured silicone coating has a wet film thickness of 1 mil to 300 mils.

In some embodiments, the uncured silicone coating has a wet film thickness of 1 mil to 280 mils. In some embodiments, the uncured silicone coating has a wet film thickness of 1 mil to 260 mils. In some embodiments, the uncured silicone coating has a wet film thickness of 1 mil to 240 mils. In some embodiments, the uncured silicone coating has a wet film thickness of 1 mil to 220 mils. In some embodiments, the uncured silicone coating has a wet film thickness of 1 mil to 200 mils. In some embodiments, the uncured silicone coating has a wet film thickness of 1 mil to 180 mils. In some embodiments, the uncured silicone coating has a wet film thickness of 1 mil to 160 mils. In some embodiments, the uncured silicone coating has a wet film thickness of 1 mil to 140 mils. In some embodiments, the uncured silicone coating has a wet film thickness of 1 mil to 120 mils. In some embodiments, the uncured silicone coating has a wet film thickness of 1 mil to 100 mils. In some embodiments, the uncured silicone coating has a wet film thickness of 1 mil to 80 mils. In some embodiments, the uncured silicone coating has a wet film thickness of 1 mil to 60 mils. In some embodiments, the uncured silicone coating has a wet film thickness of 1 mil to 40 mils. In some embodiments, the uncured silicone coating has a wet film thickness of 1 mil to 20 mils. In some embodiments, the uncured silicone coating has a wet film thickness of 1 mil to 10 mils.

In some embodiments, the method of manufacturing a roofing membrane comprises curing 506 the uncured silicone coating so as to form a partially cured silicone coating. In some embodiments, the method of manufacturing 500 comprises curing 506 the uncured silicone coating so as to form a partially cured silicone coating. In some embodiments, a partially cured silicone coating refers to a silicone coating which is not fully cured. For example, in some embodiments, a partially cured silicone coating refers to a silicone coating which is not fully crosslinked (e.g., not 100% crosslinked, or not a degree of crosslinking of 1). In some embodiments, curing 506 comprises heating for a duration sufficient to partially cure the uncured silicone coating. In some embodiments, curing 506 comprises heating for a duration sufficient to substantially cure the uncured silicone coating. In some embodiments, curing 506 may comprise exposing to at least one of moisture, ultraviolet light, or other stimulus sufficient to induce curing.

In some embodiments, curing 506 comprises heating to a temperature of 80° C. to 400° C. In some embodiments, curing 506 comprises heating to a temperature of 80° C. to 380° C. In some embodiments, curing 506 comprises heating to a temperature of 80° C. to 360° C. In some embodiments, curing 506 comprises heating to a temperature of 80° C. to 340° C. In some embodiments, curing 506 comprises heating to a temperature of 80° C. to 320° C. In some embodiments, curing 506 comprises heating to a temperature of 80° C. to 300° C. In some embodiments, curing 506 comprises heating to a temperature of 80° C. to 280° C. In some embodiments, curing 506 comprises heating to a temperature of 80° C. to 260° C. In some embodiments, curing 506 comprises heating to a temperature of 80° C. to 240° C. In some embodiments, curing 506 comprises heating to a temperature of 80° C. to 220° C. In some embodiments, curing 506 comprises heating to a temperature of 80° C. to 200° C. In some embodiments, curing 506 comprises heating to a temperature of 80° C. to 180° C. In some embodiments, curing 506 comprises heating to a temperature of 80° C. to 160° C. In some embodiments, curing 506 comprises heating to a temperature of 80° C. to 140° C. In some embodiments, curing 506 comprises heating to a temperature of 80° C. to 120° C. In some embodiments, curing 506 comprises heating to a temperature of 80° C. to 100° C.

In some embodiments, curing 506 comprises heating to a temperature of 100° C. to 400° C. In some embodiments, curing 506 comprises heating to a temperature of 120° C. to 400° C. In some embodiments, curing 506 comprises heating to a temperature of 140° C. to 400° C. In some embodiments, curing 506 comprises heating to a temperature of 160° C. to 400° C. In some embodiments, curing 506 comprises heating to a temperature of 180° C. to 400° C. In some embodiments, curing 506 comprises heating to a temperature of 200° C. to 400° C. In some embodiments, curing 506 comprises heating to a temperature of 220° C. to 400° C. In some embodiments, curing 506 comprises heating to a temperature of 240° C. to 400° C. In some embodiments, curing 506 comprises heating to a temperature of 260° C. to 400° C. In some embodiments, curing 506 comprises heating to a temperature of 280° C. to 400° C. In some embodiments, curing 506 comprises heating to a temperature of 300° C. to 400° C. In some embodiments, curing 506 comprises heating to a temperature of 320° C. to 400° C. In some embodiments, curing 506 comprises heating to a temperature of 340° C. to 400° C. In some embodiments, curing 506 comprises heating to a temperature of 360° C. to 400° C. In some embodiments, curing 506 comprises heating to a temperature of 380° C. to 400° C.

It will be appreciated that steps 504 and 506 may be repeated one or more times until a desired thickness of the silicone coating is obtained.

In some embodiments, the method of manufacturing a roofing membrane comprises applying 508 the plurality of particles to at least a portion of a surface of the partially cured silicone coating. In some embodiments, the applying 508 comprises embedding the plurality of particles onto at least a portion of a surface of the partially cured silicone coating. In some embodiments, the applying 508 comprises bonding the plurality of particles to at least a portion of a surface of the partially cured silicone coating. In some embodiments, the applying 508 comprises pressing the plurality of particles into at least a portion of a surface of the partially cured silicone coating. In some embodiments, the applying 508 comprises pouring the plurality of particles onto at least a portion of a surface of the partially cured silicone coating. In some embodiments, the applying 508 comprises disposing the plurality of particles onto at least a portion of a surface of the partially cured silicone coating. In some embodiments, the applying 508 comprises contacting the plurality of particles with at least a portion of a surface of the partially cured silicone coating. In some embodiments, the applying 508 comprises spraying the plurality of particles onto at least a portion of a surface of the partially cured silicone coating. In some embodiments, the applying 508 is performed on the final layer of the silicone coating for multi-layered silicone coatings.

In some embodiments, the method of manufacturing a roofing membrane comprises applying 510 the surface layer composition to at least a portion of a surface of the partially cured silicone coating and/or at least a portion of a surface of the plurality of particles. In some embodiments, the applying 510 comprises coating the surface layer composition onto at least a portion of a surface of the partially cured silicone coating and/or at least a portion of a surface of the plurality of particles. In some embodiments, the applying 510 comprises bonding the surface layer composition to at least a portion of a surface of the partially cured silicone coating and/or at least a portion of a surface of the plurality of particles. In some embodiments, the applying 510 comprises pouring the surface layer composition onto at least a portion of a surface of the partially cured silicone coating and/or at least a portion of a surface of the plurality of particles. In some embodiments, the applying 510 comprises disposing the surface layer composition on at least a portion of a surface of the partially cured silicone coating and/or at least a portion of a surface of the plurality of particles. In some embodiments, the applying 510 comprises contacting the surface layer composition with at least a portion of a surface of the partially cured silicone coating and/or at least a portion of a surface of the plurality of particles. In some embodiments, the applying 510 comprises spraying the surface layer composition onto at least a portion of a surface of the partially cured silicone coating and/or at least a portion of a surface of the plurality of particles. In some embodiments, the applying 510 is performed on the final layer of the silicone coating for multi-layered silicone coatings.

In some embodiments, the method of manufacturing a roofing membrane comprises curing 512 the partially cured silicone coating to obtain a cured silicone coating. In some embodiments, a cured silicone coating refers to a silicone coating which is fully cured. For example, in some embodiments, a cured silicone coating refers to a silicone coating which is fully crosslinked (e.g., 100% crosslinked, or a degree of crosslinking of 1). In some embodiments, curing 512 comprises heating for a duration sufficient to cure the uncured silicone coating. In some embodiments, curing 512 comprises heating for a duration sufficient to cure the uncured silicone coating. In some embodiments, curing 512 may comprise exposing to at least one of moisture, ultraviolet light, or other stimulus sufficient to induce curing.

In some embodiments, curing 512 comprises heating to a temperature of 80° C. to 400° C. In some embodiments, curing 512 comprises heating to a temperature of 80° C. to 380° C. In some embodiments, curing 512 comprises heating to a temperature of 80° C. to 360° C. In some embodiments, curing 512 comprises heating to a temperature of 80° C. to 340° C. In some embodiments, curing 512 comprises heating to a temperature of 80° C. to 320° C. In some embodiments, curing 512 comprises heating to a temperature of 80° C. to 300° C. In some embodiments, curing 512 comprises heating to a temperature of 80° C. to 280° C. In some embodiments, curing 512 comprises heating to a temperature of 80° C. to 260° C. In some embodiments, curing 512 comprises heating to a temperature of 80° C. to 240° C. In some embodiments, curing 512 comprises heating to a temperature of 80° C. to 220° C. In some embodiments, curing 512 comprises heating to a temperature of 80° C. to 200° C. In some embodiments, curing 512 comprises heating to a temperature of 80° C. to 180° C. In some embodiments, curing 512 comprises heating to a temperature of 80° C. to 160° C. In some embodiments, curing 512 comprises heating to a temperature of 80° C. to 140° C. In some embodiments, curing 512 comprises heating to a temperature of 80° C. to 120° C. In some embodiments, curing 512 comprises heating to a temperature of 80° C. to 100° C.

In some embodiments, curing 512 comprises heating to a temperature of 100° C. to 400° C. In some embodiments, curing 512 comprises heating to a temperature of 120° C. to 400° C. In some embodiments, curing 512 comprises heating to a temperature of 140° C. to 400° C. In some embodiments, curing 512 comprises heating to a temperature of 160° C. to 400° C. In some embodiments, curing 512 comprises heating to a temperature of 180° C. to 400° C. In some embodiments, curing 512 comprises heating to a temperature of 200° C. to 400° C. In some embodiments, curing 512 comprises heating to a temperature of 220° C. to 400° C. In some embodiments, curing 512 comprises heating to a temperature of 240° C. to 400° C. In some embodiments, curing 512 comprises heating to a temperature of 260° C. to 400° C. In some embodiments, curing 512 comprises heating to a temperature of 280° C. to 400° C. In some embodiments, curing 512 comprises heating to a temperature of 300° C. to 400° C. In some embodiments, curing 512 comprises heating to a temperature of 320° C. to 400° C. In some embodiments, curing 512 comprises heating to a temperature of 340° C. to 400° C. In some embodiments, curing 512 comprises heating to a temperature of 360° C. to 400° C. In some embodiments, curing 512 comprises heating to a temperature of 380° C. to 400° C.

While silicone roofing membranes are disclosed herein, it will be appreciated that any one or more of the roofing materials disclosed herein may be employed, without departing from the scope of this disclosure.

What is claimed is:

1. A roll comprising:
a silicone roofing membrane,
    wherein the silicone roofing membrane has a first surface and a second surface opposite the first surface,
    wherein at least a portion of the second surface of the silicone roofing membrane contacts at least a portion of the first surface of the silicone roofing membrane;
    wherein at least a portion of the second surface of the silicone roofing membrane is an outer surface of the roll;
  wherein the silicone roofing membrane comprises:
    a plurality of particles;
    a silicone coating;
    a substrate;
    an adhesive layer; and
    a release liner;
      wherein the substrate comprises at least one of a mesh, a fabric, a scrim, a woven, a non-woven, or any combination thereof;
      wherein the substrate is located between the silicone coating and the adhesive layer,
      wherein the silicone coating covers the entirety of a surface of the substrate;
      wherein the silicone coating directly contacts the surface of the substrate;
      wherein the adhesive layer is located between the substrate and the release liner;
      wherein the release liner covers at least a portion of the adhesive layer;
      wherein the plurality of particles covers at least a portion of a surface of the silicone coating;
      wherein each of the plurality of particles has a surface,
      wherein, when the silicone roofing membrane is installed on a roofing substrate, at least a portion of the surface of the plurality of particles is exposed to an environment;
      wherein the first surface of the silicone roofing membrane is the surface of the silicone coating;
      wherein the second surface of the silicone roofing membrane is a surface of the release liner.

2. The roll of claim 1, wherein, when the silicone roofing membrane is installed on a roofing substrate, at least a portion of the surface of the silicone coating is exposed to the environment.

3. The roll of claim 1, wherein, when the silicone roofing membrane is installed on a roofing substrate,
    1% to 99% of the surface of the plurality of particles is exposed to the environment; and
    1% to 99% of the surface of the silicone coating is exposed to the environment.

4. The roll of claim 1, wherein the plurality of particles directly contacts the surface of the silicone coating.

5. The roll of claim 1, wherein the plurality of particles is embedded in the surface of the silicone coating.

6. The roll of claim 1, wherein the plurality of particles covers 50% to 99% of the surface of the silicone coating.

7. The roll of claim 1, wherein the plurality of particles comprises at least one of a sand, a polymer fiber, a glass fiber, a glass bead, a recycled granule, a polymeric granule, a mineral granule, a water-soluble granule, a polymeric powder, or any combination thereof.

8. The roll of claim 1, wherein the silicone coating comprises at least one of a polysiloxane, a silyl-terminated polymer, or any combination thereof.

9. A roofing system comprising:
a roofing substrate; and
a silicone roofing membrane,
    wherein the silicone roofing membrane is located on the roofing substrate;
  wherein the silicone roofing membrane comprises:
    a plurality of particles;
    a silicone coating;
    a substrate; and
    an adhesive layer;
      wherein the substrate comprises at least one of a mesh, a fabric, a scrim, a woven, a non-woven, or any combination thereof;
      wherein the substrate is located between the silicone coating and the adhesive layer,
      wherein the silicone coating covers the entirety of a surface of the substrate;
      wherein the silicone coating directly contacts the surface of the substrate;
      wherein the adhesive layer is located between the substrate and the roofing substrate;
      wherein the adhesive layer adheres the silicone roofing membrane to the roofing substrate;
      wherein the plurality of particles covers at least a portion of a surface of the silicone coating;
      wherein each of the plurality of particles has a surface,
      wherein at least a portion of the surface of the plurality of particles is exposed to an environment.

10. The roofing system of claim 9, wherein at least a portion of the surface of the silicone coating is exposed to the environment.

11. The roofing system of claim 9, wherein the plurality of particles directly contacts the surface of the silicone coating.

12. The roofing system of claim 9, wherein the plurality of particles is embedded in the surface of the silicone coating.

13. The roofing system of claim 9, wherein the plurality of particles comprises at least one of a sand, a polymer fiber, a glass fiber, a glass bead, a recycled granule, a polymeric granule, a mineral granule, a water-soluble granule, a polymeric powder, or any combination thereof.

14. The roofing system of claim 9, wherein the silicone coating comprises at least one of a polysiloxane, a silyl-terminated polymer, or any combination thereof.

15. A method of installation comprising:

obtaining a roll of a silicone roofing membrane, wherein the silicone roofing membrane has a first surface and a second surface opposite the first surface, wherein at least a portion of the second surface of the silicone roofing membrane contacts at least a portion of the first surface of the silicone roofing membrane;

wherein at least a portion of the second surface of the silicone roofing membrane is an outer surface of the roll;

wherein the silicone roofing membrane comprises:

a plurality of particles;

a silicone coating;

a substrate;

an adhesive layer; and a release liner;

wherein the substrate comprises at least one of a mesh, a fabric, a scrim, a woven, a non-woven, or any combination thereof;

wherein the substrate is located between the silicone coating and the adhesive layer, wherein the silicone coating covers the entirety of a surface of the substrate;

wherein the silicone coating directly contacts the surface of the substrate;

wherein the adhesive layer is located between the substrate and the release liner;

wherein the release liner covers at least a portion of the adhesive layer;

wherein the plurality of particles covers at least a portion of a surface of the silicone coating;

wherein each of the plurality of particles has a surface;

wherein the first surface of the silicone roofing membrane is the surface of the silicone coating;

wherein the second surface of the silicone roofing membrane is a surface of the release liner;

unrolling the roll of the silicone roofing membrane;

removing the release liner from the silicone roofing membrane so as to expose the adhesive layer; and contacting the adhesive layer of the silicone roofing membrane to a roofing substrate so as to adhere the silicone roofing membrane to the roofing substrate;

wherein at least a portion of the surface of the plurality of particles is exposed to an environment.

16. The method of claim 15, wherein at least a portion of the surface of the silicone coating is exposed to the environment.

17. The method of claim 15, wherein the plurality of particles is embedded in the surface of the silicone coating.

18. The method of claim 15, wherein the plurality of particles comprises at least one of a sand, a polymer fiber, a glass fiber, a glass bead, a recycled granule, a polymeric granule, a mineral granule, a water-soluble granule, a polymeric powder, or any combination thereof.

* * * * *